(12) United States Patent
Title et al.

(10) Patent No.: US 10,628,503 B2
(45) Date of Patent: Apr. 21, 2020

(54) SYSTEMS AND METHODS FOR ONLINE WEB SITE LEAD GENERATION SERVICE

(71) Applicant: GUBAGOO, INC., West Palm Beach, CA (US)

(72) Inventors: Bradley Title, Boynton Beach, FL (US); Sergey Chayko, Toronto (CA)

(73) Assignee: Gubagoo, Inc., West Palm Beach, FL (US)

( * ) Notice: Subject to any disclaimer, the term of this patent is extended or adjusted under 35 U.S.C. 154(b) by 39 days.

(21) Appl. No.: 14/218,387

(22) Filed: Mar. 18, 2014

(65) Prior Publication Data

US 2014/0344217 A1 Nov. 20, 2014

Related U.S. Application Data

(63) Continuation-in-part of application No. 13/686,836, filed on Nov. 27, 2012, now Pat. No. 9,189,798.

(51) Int. Cl.
*G06F 16/9535* (2019.01)
*G06Q 30/02* (2012.01)
*G06F 16/23* (2019.01)

(52) U.S. Cl.
CPC ......... *G06F 16/9535* (2019.01); *G06F 16/23* (2019.01); *G06Q 30/02* (2013.01)

(58) Field of Classification Search
CPC ......... G06F 17/30864; G06F 17/30867; G06F 16/9535; G06Q 30/02
USPC ................................ 707/709, 710, 784, 609
See application file for complete search history.

(56) References Cited

U.S. PATENT DOCUMENTS

| | | | |
|---|---|---|---|
| 6,868,389 B1* | 3/2005 | Wilkins | G06Q 30/0201 705/1.1 |
| 7,620,697 B1* | 11/2009 | Davies | H04L 43/00 709/217 |
| 7,698,270 B2* | 4/2010 | Brave | G06F 16/9535 707/603 |
| 7,747,941 B2* | 6/2010 | Campbell | G06F 17/243 715/234 |
| 8,234,161 B1* | 7/2012 | Sazhin | G06Q 30/0236 705/14.12 |
| 2002/0107776 A1* | 8/2002 | Bove | G06Q 30/02 705/37 |
| 2005/0154648 A1* | 7/2005 | Strause | G06Q 30/02 705/26.41 |

(Continued)

FOREIGN PATENT DOCUMENTS

AU 2010217733 A1 9/2010

*Primary Examiner* — Pierre M Vital
*Assistant Examiner* — Nargis Sultana
(74) *Attorney, Agent, or Firm* — One LLP; Joseph K. Liu

(57) ABSTRACT

The field of the invention relates to systems and methods for operation of lead generation service, and more particularly to systems and methods that generate leads for website owners based on the behavioral engagement of the users of the websites. In a preferred embodiment, the system includes a lead generation server system coupled to a public network and accessible to one or more users. The lead generation server system includes a database that stores behavioral data associated with the one or more website users. The system is configured to respond to the one or more users based on the behavioral data, and to identify lead information for the website owner.

7 Claims, 35 Drawing Sheets

(56) References Cited

U.S. PATENT DOCUMENTS

| | | | |
|---|---|---|---|
| 2006/0229942 A1* | 10/2006 | Miller | G06Q 30/02 705/14.46 |
| 2007/0003038 A1* | 1/2007 | Siegel | H04M 15/00 379/201.01 |
| 2007/0043766 A1* | 2/2007 | Nicholas | H04L 67/02 |
| 2007/0129993 A1* | 6/2007 | Alvin | G06Q 30/02 705/7.32 |
| 2007/0245035 A1* | 10/2007 | Attaran Rezaei | G06N 7/00 709/238 |
| 2007/0282795 A1* | 12/2007 | Mashinsky | G06F 17/3089 |
| 2008/0183745 A1* | 7/2008 | Cancel | G06Q 30/02 |
| 2008/0201206 A1* | 8/2008 | Pokorney | G06F 17/2247 705/7.29 |
| 2008/0201643 A1 | 8/2008 | Nagaitis et al. | |
| 2008/0228819 A1 | 9/2008 | Minnis et al. | |
| 2008/0288361 A1* | 11/2008 | Rego | G06Q 30/02 705/26.3 |
| 2008/0306830 A1* | 12/2008 | Lasa | G06Q 30/02 705/14.16 |
| 2009/0158163 A1* | 6/2009 | Stephens | G06Q 10/10 715/738 |
| 2009/0240602 A1* | 9/2009 | Mohr | G06Q 10/00 705/26.1 |
| 2010/0076937 A1* | 3/2010 | Abdelnur | G06F 16/9566 707/679 |
| 2010/0131835 A1* | 5/2010 | Kumar | G06Q 30/0224 715/205 |
| 2010/0205024 A1* | 8/2010 | Shachar | G06Q 30/02 705/7.33 |
| 2010/0274815 A1* | 10/2010 | Vanasco | G06Q 10/107 707/798 |
| 2011/0078487 A1* | 3/2011 | Nielsen | G06Q 30/02 714/2 |
| 2012/0036259 A1 | 2/2012 | Minnis et al. | |
| 2012/0059662 A1* | 3/2012 | Huisman, Jr. | G06Q 10/10 705/1.1 |
| 2012/0095835 A1* | 4/2012 | Makar | G06Q 10/10 705/14.53 |
| 2012/0130844 A1* | 5/2012 | Picard | G06Q 10/06 705/26.4 |
| 2012/0290491 A1* | 11/2012 | Rafferty | G06Q 10/10 705/317 |
| 2013/0046683 A1* | 2/2013 | Onder | G06Q 30/0244 705/39 |
| 2013/0066676 A1* | 3/2013 | Williams | G06Q 30/00 705/7.29 |
| 2013/0124259 A1* | 5/2013 | Chourey | G06Q 30/0201 705/7.29 |
| 2013/0132365 A1* | 5/2013 | Chang | G06Q 30/0241 707/710 |
| 2013/0191208 A1* | 7/2013 | Chourey | G06Q 30/0201 705/14.45 |
| 2014/0075014 A1 | 3/2014 | Chourey | |

\* cited by examiner

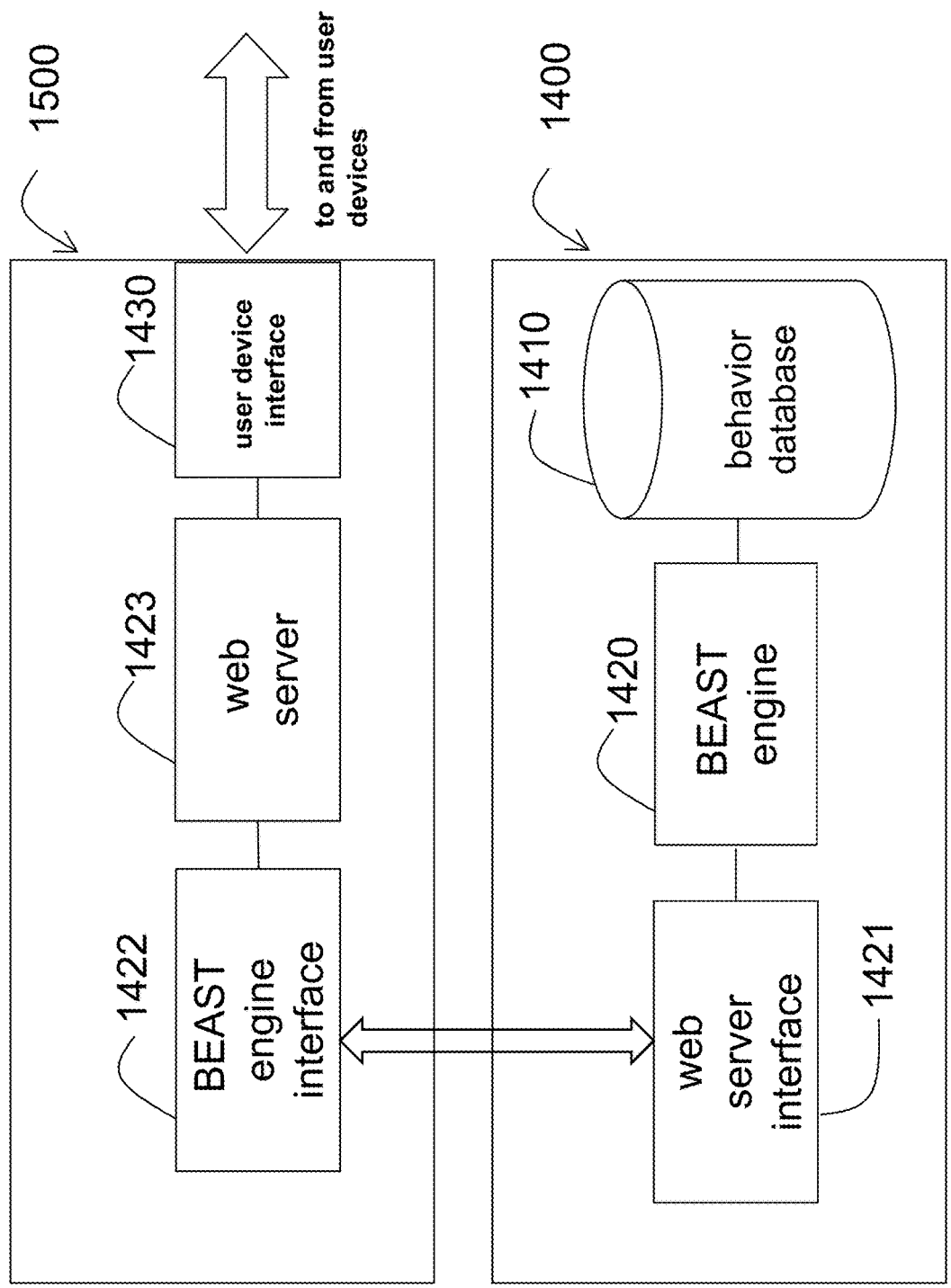

Fig. 3

| Score Indexes | | | |
|---|---|---|---|
| On-Site | [enable/disable] [set score limit] | no | bool, int |
| Returns | [set value] | No | int |
| Load URL | [set value] | No | int |
| Time on page | [set time][set value] | Yes | text, int |
| Time On Site | [set time][set value] | Yes | text, int |
| Started Chat | [set value] | No | int |
| Completed Chat | [set value] | No | int |
| Form Submission | [set value] | no | int |
| Become Lead | [set value] | No | int |
| Lead type | | | |
| Configurable parameter | [set value] | yes | int |
| Department | | | |
| Configurable parameter | [set value] | yes | int |
| Toolbar App Click | [set value] | no | int |
| Load Specific URL | [add URL][set value] | yes | text, int |
| View Item | | | |
| Configurable parameter | [set value] | | int |
| Redeemed Offer | [set value] | | int |

| Off-Site Index | [enable/disable] [set score limit] | | |
|---|---|---|---|
| HTTP Referer URL | [set URL][set value] | yes | text, int |
| Campaign | [select campaign name][set value] | yes | text, int |
| Time on Gubagoo Network | [set time][set value] | yes | text, int |
| Average Time on Site | [set time range] [set value] | yes | text, int |
| Visited Websites | [set website][set value] | yes | text, int |
| Started Chat | [set value] | no | int |
| Completed Chat | [set value] | no | int |
| Form Submission | [set value] | no | int |
| Become Lead | [set value] | no | int |
| Lead type | | | |
| Configurable parameter | [set value] | yes | int |
| Department | | | |
| Configurable parameter | [set value] | yes | int |
| Brand Affinity | [select brand] [set value] | yes | text, int |
| Load Specific URL | [add URL][set value] | yes | text, int |
| View item | | | |
| Configurable parameter | [set value] | yes | int |
| Redeem Offer | [set value] | no | int |

4000

4100

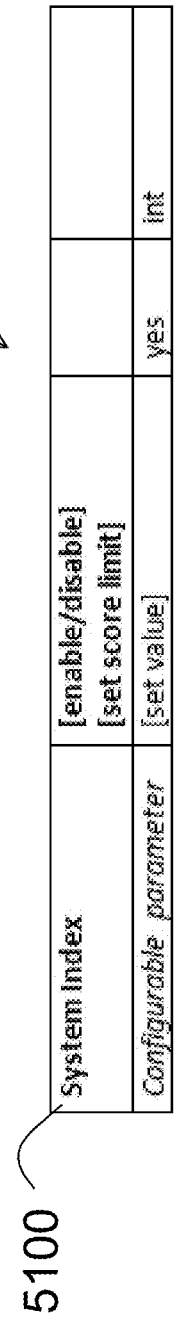
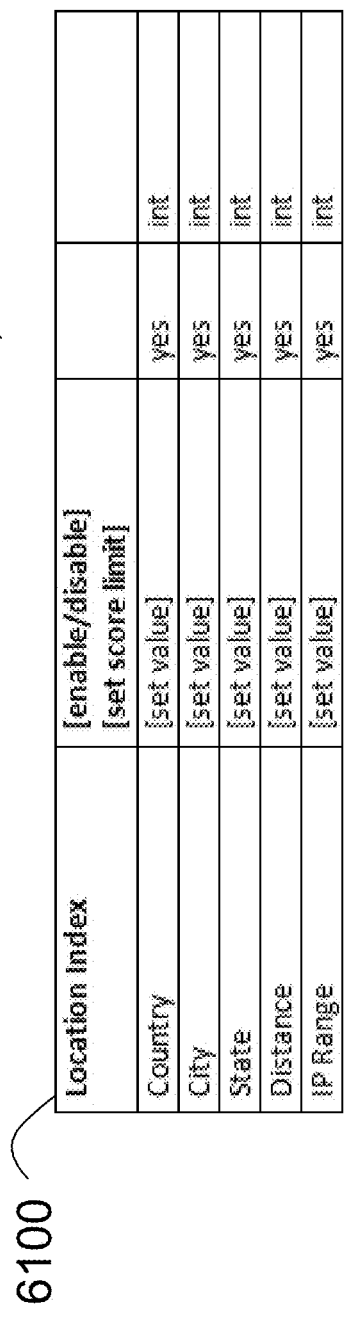
Fig. 5
Fig. 6

Fig. 7

| Demographic Index | [enable/disable] [set score limit] | | |
|---|---|---|---|
| Male | [set value] | no | int |
| Female | [set value] | no | int |
| Has Kids | [set value] | no | int |
| No Kids | [set value] | no | int |
| Income | | | |
| $0-50k | [set value] | no | int |
| $50-100k | [set value] | no | int |
| $100-150k | [set value] | no | int |
| $150k+ | [set value] | no | int |
| Education | | | |
| No College | [set value] | no | int |
| College | [set value] | no | int |
| Grad School | [set value] | no | int |
| Caucasian | [set value] | no | int |
| African American | [set value] | no | int |
| Asian | [set value] | no | int |
| Hispanic | [set value] | no | int |
| Other | [set value] | no | int |

7100 — 7000

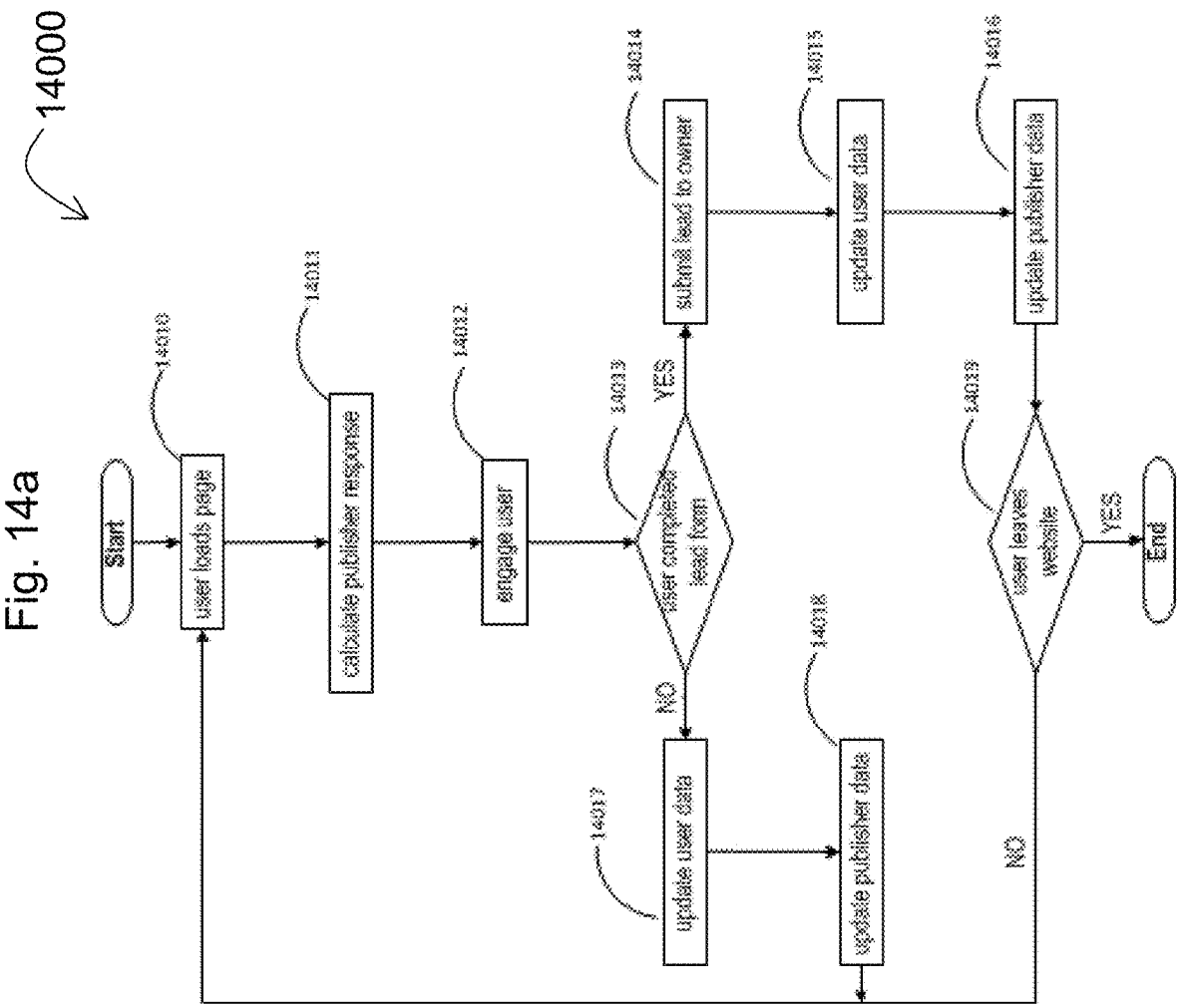

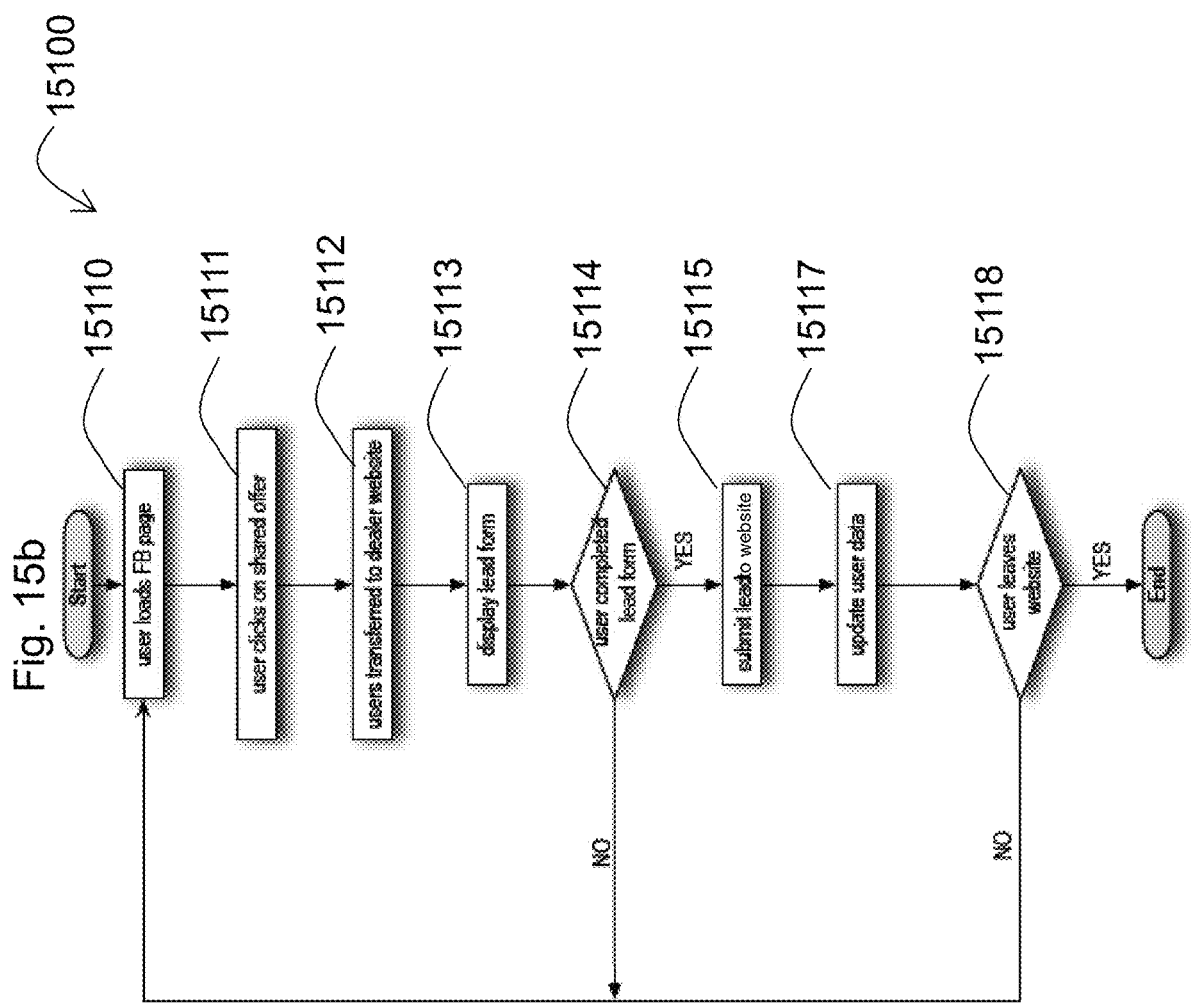

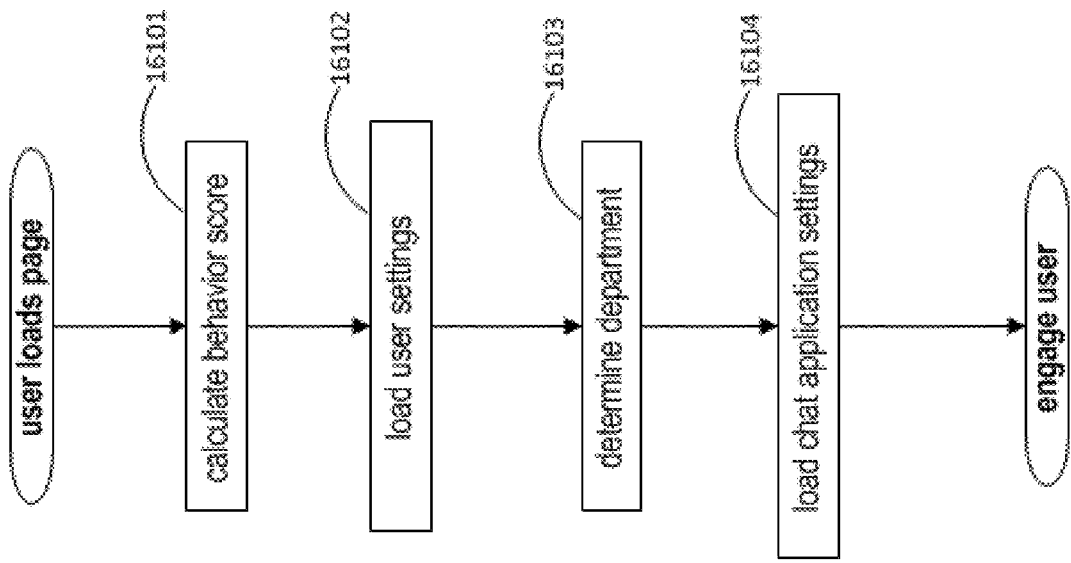

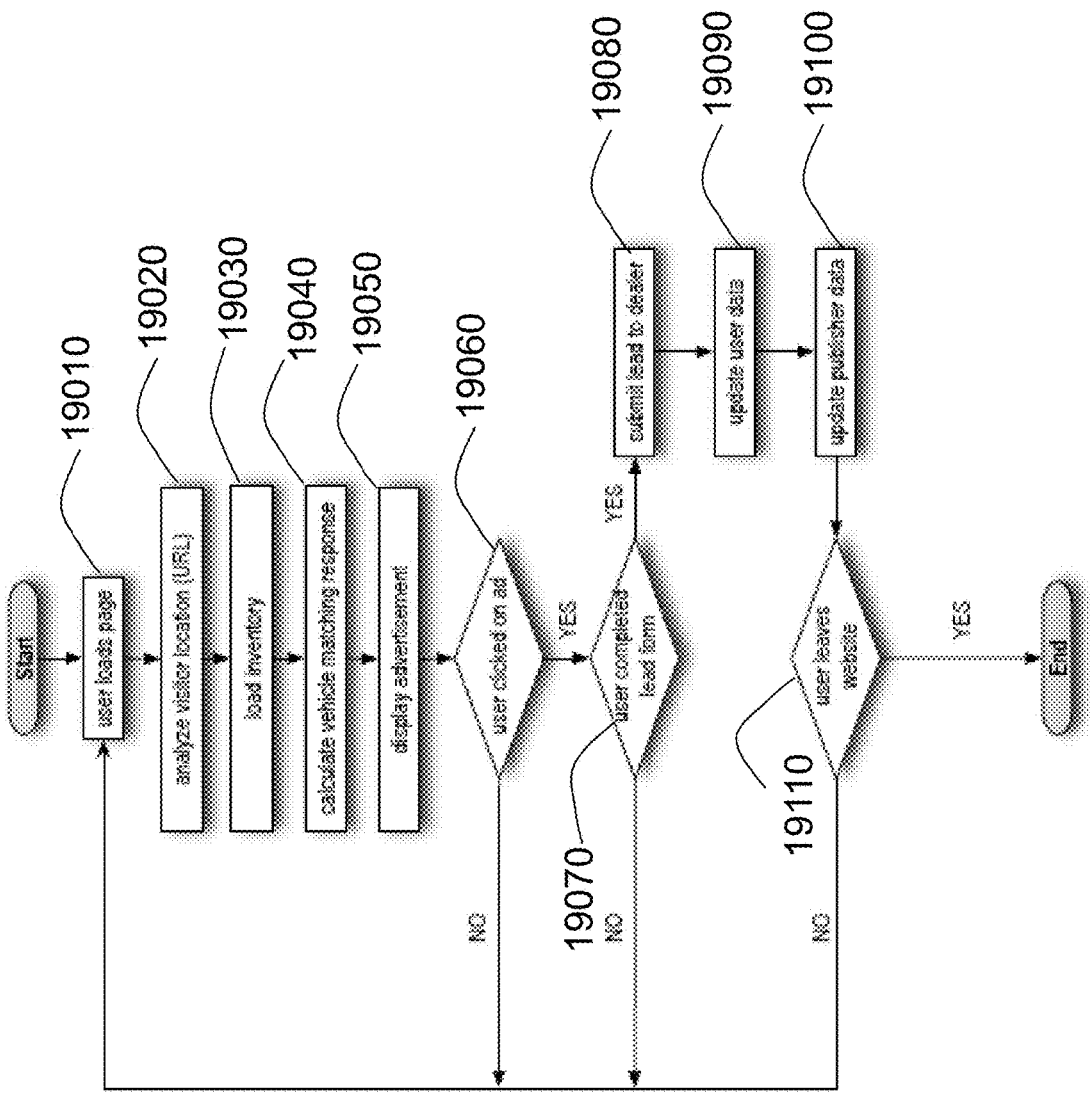

SYSTEMS AND METHODS FOR ONLINE WEB SITE LEAD GENERATION SERVICE

CROSS-REFERENCE TO RELATED APPLICATIONS

This application is a continuation-in-part application of U.S. application Ser. No. 13/686,836, entitled "SYSTEM AND METHOD FOR ONLINE WEBSITE LEAD GENERATION" filed Nov. 27, 2012, which is hereby incorporated in its entirety by reference.

FIELD OF THE INVENTION

The field of the invention relates to systems and methods for online website lead generating services, and more particularly to systems and methods that generate leads for website owners based on the behavioral engagement of the users of the websites.

BACKGROUND OF THE INVENTION

With the popularity of the Internet and the proliferation of websurfing, one of the best methods to find marketing leads is to follow the behavior of web users. Currently when a user visits a retail or commercial website, to capture the user's business, the website typically offers to the user submission forms to fill out in order to generate a lead without regard to the user's previous behavior inside and/or outside the website. When chat functionality is provided, it is in an on-demand mode where the user is offered a chat button to click on, or an automated chat popup would appear, again without regard to the user's previous behavior inside and/or outside the website. These methods provide only passive engagement not tailored to the user's browsing pattern and have significant disconnect with the website system as a whole.

Leads may also be generated when a website helps its users, or visitors, find what they want or need when they visit the website. However, most websites cannot provide adequate information search and retrieval tools due to the complexity of the users' browsing patterns, different computer experience, time they have on hand, their location and goals that they are trying to accomplish. As a result, the inadequate information generates ineffective leads and/or low rates of conversion from traffic to leads.

Moreover, the tools the website owners often use to engage the website users are usually not integrated, and may be provided by different vendors. These tools create a potentially unstable system environment, which in turn reduces the quality of the user's browsing experience and are incapable of providing a coherent full circle visitor (visitor and user are used interchangeably herein) activity and engagement reporting and performance metrics. In these cases, the leads that the website owners receive from the non-integrated tools can be of low quality due to lack of the behavioral analysis of the users. Accordingly, improved systems and methods to provide website users with the most efficient access to the information they are looking for, to provide website owners with high rates of conversion from traffic to high quality leads, and to provide comprehensive reporting and performance metrics may be desirable.

SUMMARY OF THE INVENTION

The field of the invention relates to systems and methods for operation of an online website lead generation service, and more particularly to systems and methods that provide website users with the most efficient access to the information they are looking for, website owners with the highest quality leads, and comprehensive reporting and performance metrics.

In a preferred embodiment, the system includes a website lead generation server system coupled to a public network and accessible to one or more users. The lead generation server system includes a database that stores behavioral data associated with one or more website users. The system is configured to respond to the one or more users based on the behavioral data, and to identify lead information for the website owner.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1b is an exemplary diagram of a website lead generation server system in accordance with a preferred embodiment of the present invention;

FIG. 3 is an exemplary table of score indexes used by the BEAST engine in accordance with a preferred embodiment of the present invention;

FIG. 4 is another exemplary table of score indexes used by the BEAST engine in accordance with a preferred embodiment of the present invention;

FIG. 5 is another exemplary table of score indexes used by the BEAST engine in accordance with a preferred embodiment of the present invention;

FIG. 6 is another exemplary table of score indexes used by the BEAST engine in accordance with a preferred embodiment of the present invention;

FIG. 7 is another exemplary table of score indexes used by the BEAST engine in accordance with a preferred embodiment of the present invention;

FIG. 14a is another exemplary process of a website lead generation system in accordance with a preferred embodiment of the present invention;

FIG. 15b is another exemplary process of a website lead generation system in accordance with a preferred embodiment of the present invention;

FIG. 16b is another exemplary process of a website lead generation system in accordance with a preferred embodiment of the present invention;

FIG. 19 is another exemplary process of a website lead generation system in accordance with a preferred embodiment of the present invention;

FIGS. 28a and 28b show an exemplary vehicle management control panel interface in accordance with a preferred embodiment of the present invention.

DETAILED DESCRIPTION OF THE PREFERRED EMBODIMENTS

Preferred Systems

Figure 1A:
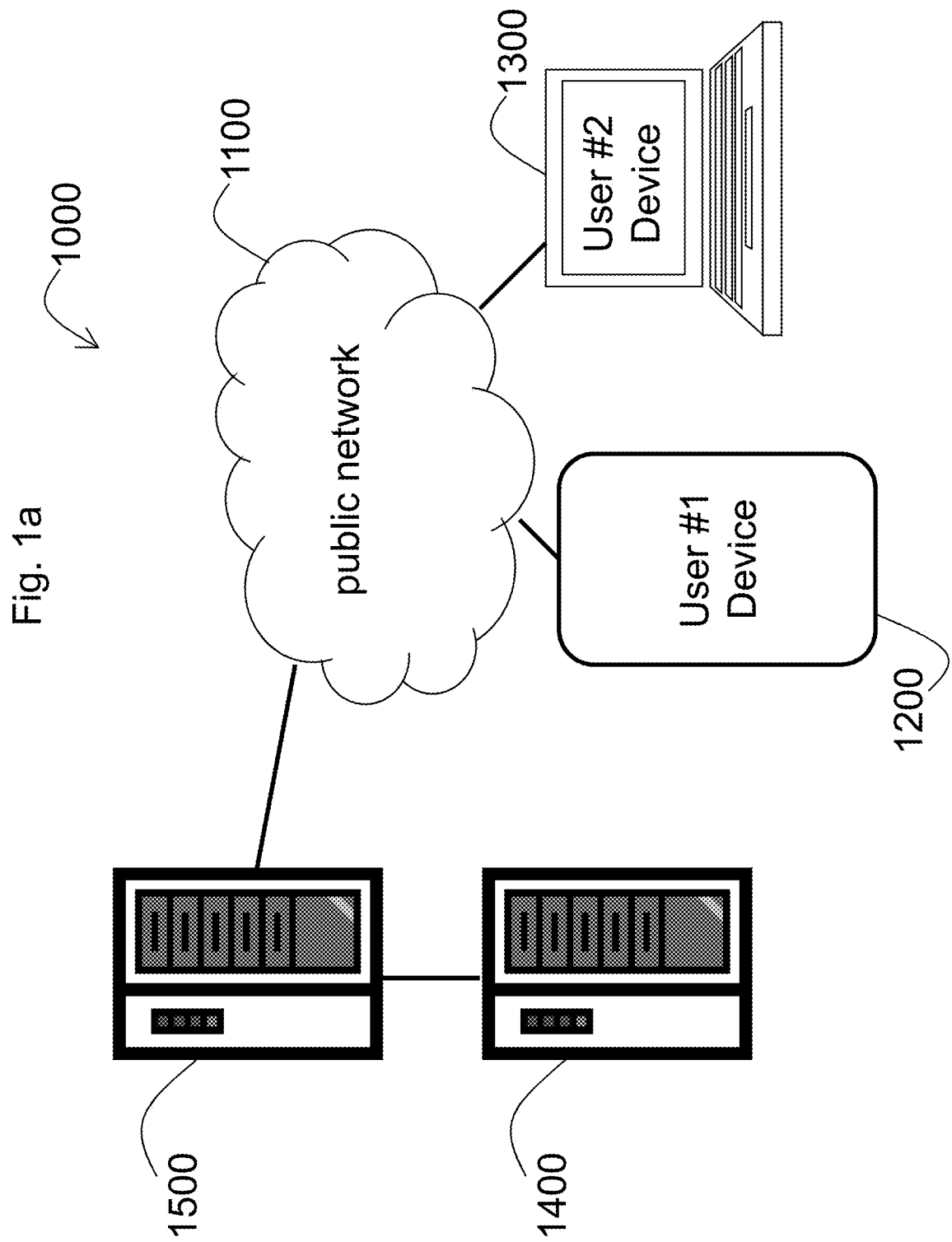
FIG. 1a is an exemplary diagram of a website lead generation system in accordance with a preferred embodiment of the present invention.

Turning to FIG. 1a, a computer-based website lead generation system 1000 in accordance with a preferred embodiment of the present invention is shown. The system 1000 generally includes a webserver system 1500 and a website lead generation server system 1400, both may be distributed on one or more physical servers, each having processor, memory, an operating system, and input/output interface, and a network interface all known in the art, and a plurality of end user computing devices 1200/1300 coupled to a public network 1100, such as the Internet and/or a cellular-based wireless network.

Turning to the webserver system 1500, an exemplary embodiment is shown in FIG. 1b. Generally, the webserver system 1500 includes a webserver 1423 designed to provide web services to visitors (users). The terms user, visitor and consumer are used interchangeably herein. The webserver system 1500 also includes a Behavioral Engagement and Scoring Technology (BEAST) interface 1422 for communication and exchange of data with the website lead generation server system 1400.

Turning to the website lead generation server system 1400, an exemplary embodiment is shown in FIG. 1b. Generally, a website lead generation server system 1400 includes a website server interface 1421 for communication and exchange of data with the webserver system 1500. The website lead generation server system 1400 also includes a Behavioral Engagement and Scoring Technology (BEAST) engine 1420 designed to assist visitors of the webserver system 1500 to achieve a richer and more meaningful website visitor experience, and to generate leads for the website owners. The BEAST engine 1420 is designed to intuitively help website owners transform once anonymous visitors to the websites into identifiable consumers by using behavioral intelligence system. The BEAST engine 1420 tracks all visitor activities to create an accumulative running score for each visitor. Understanding visitor behavior facilitates effective visitor (consumer) engagement, builds visitor loyalty, and converts the visitor into a lead.

By scoring online behavior of the visitors, the BEAST engine 1420 profiles the visitors, optimizes and delivers targeted offers, chat, tool bar, and social media sharing to them in real-time. The algorithms of the BEAST engine 1420 analyzes these scores, making it possible to optimize and publish offers, incentives or rewards, intelligent chat, tool bar, and social media sharing, in real-time to new or repeat visitors. The algorithms include, e.g., analyses of where a visitor to the website comes from (e.g., location, referrer, search engine, email campaign), whether the visitor is a returning visitor and how many times has the visitor been on the website and which (inventory) pages did the visitor browse through during each visit, whether the visitor has been on other similar websites and how many times has the visitor been on those websites and which (inventory) pages did the visitor browse through during each visit, the time that the visitor spends on the website, whether the visitor has engaged in online chat on this website, whether the visitor has submitted a lead form on this website, what incentives has the visitor received before, and so on. The scoring algorithms are flexible to match the strategies of the website owners. The scoring and other information of each visitor are stored in a Visitor Engagement Profile (VEP) in a behavior database 1410.

The BEAST engine 1420 captures visitor information, keeps statistics on this information, performs analyses, and generates reports on the visitor behavior. The BEAST engine 1420 captures visitor information from the visitor browsing sessions. Every time a visitor visits the website, the BEAST engine 1420 captures and stores the visitor's click pattern and path. The BEAST engine 1420 combines the captured information with previously captured information of the same visitor within the network of the website lead generation server system 1400 to create an accurate browsing and behavior pattern. The network of the website lead generation server system 1400 includes all websites that have installed the Toolbar (FIG. 12) which enables the website lead generation server system 1400 to collect visitor browsing information. This network includes websites that do not currently have the Toolbar installed but had it installed in the past. As a result, the visitor's activity outside of the currently browsed website is taken into account when composing the Visitor Engagement Profile.

The analyses include, e.g., real time visitor browsing activity, peak time activity, most visited pages, visitor info and leads (individual accounts), pre-compiled visitor activity and leads (enterprise level and account groups, account comparison), Publisher activity (FIG. 9) and leads, chat activity (FIG. 11) and leads, ShareNow activity (FIG. 10) and leads, callbacks activity and leads, Toolbar activity (FIG. 12) and leads, keyword tracking, and so on. The reports may include, e.g., the above statistics and analyses, ad campaign tracking and performance reports, and so on. The reports are customizable and may include scalable number of simultaneous chat sessions. Various schemes of access control to the statistics, analyses and reports may be implemented.

Figure 1C:
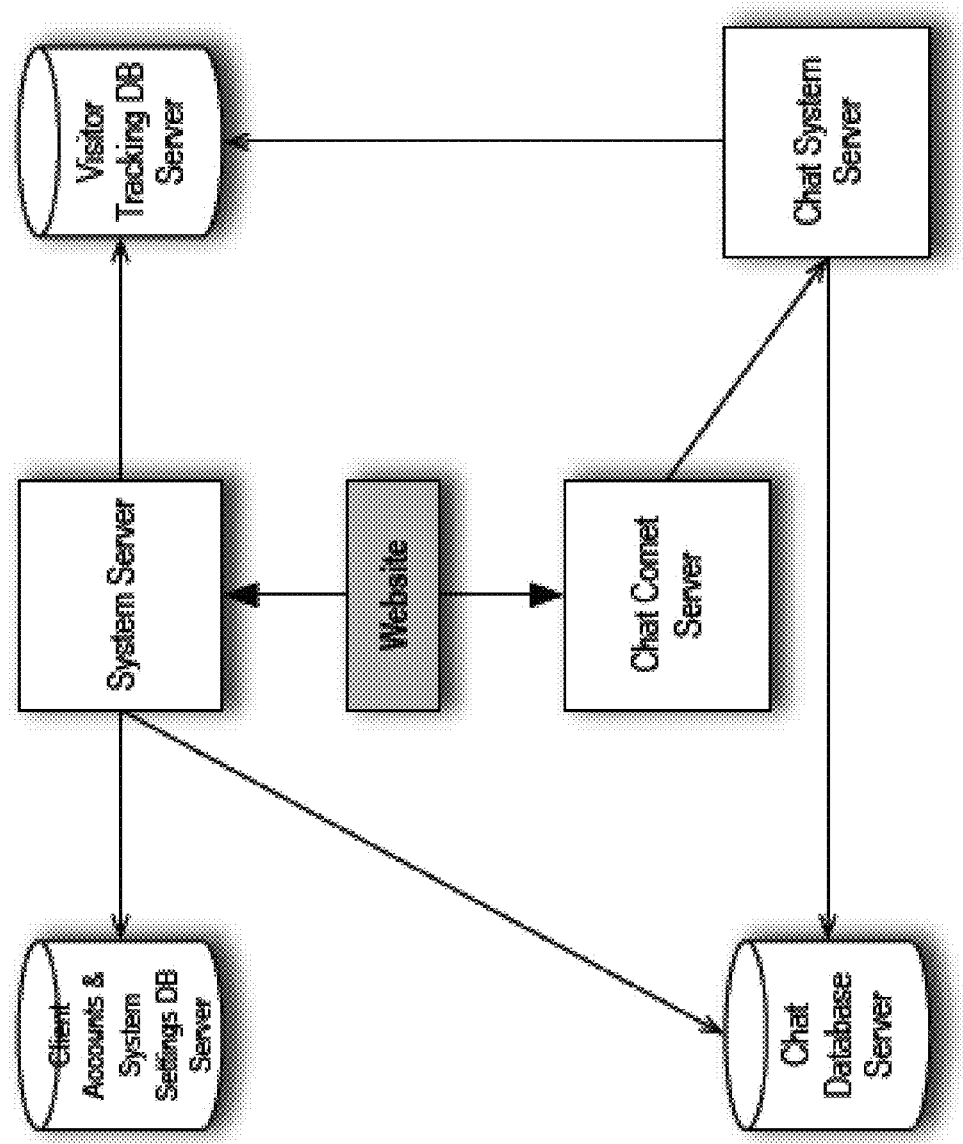
FIG. 1c is another exemplary diagram of a website lead generation server system in accordance with a preferred embodiment of the present invention.

Turning to FIG. 1c, an exemplary embodiment of the website lead generation server system 1600 is shown. As mentioned above, the website lead generation server system 1400 may be distributed on one or more physical servers. For example, the BEAST engine may comprise a Visitor Tracking Database Server and a Client Accounts & System Setting Database Server. The webserver 1423 may comprise a System Server, a Chat Comet Server, a Chat System Server, a Chat Database Server, and so on. The behavior database 1410 may comprise a Visitor Tracking Database and a Client Accounts & System Setting Database.

Figure 2:
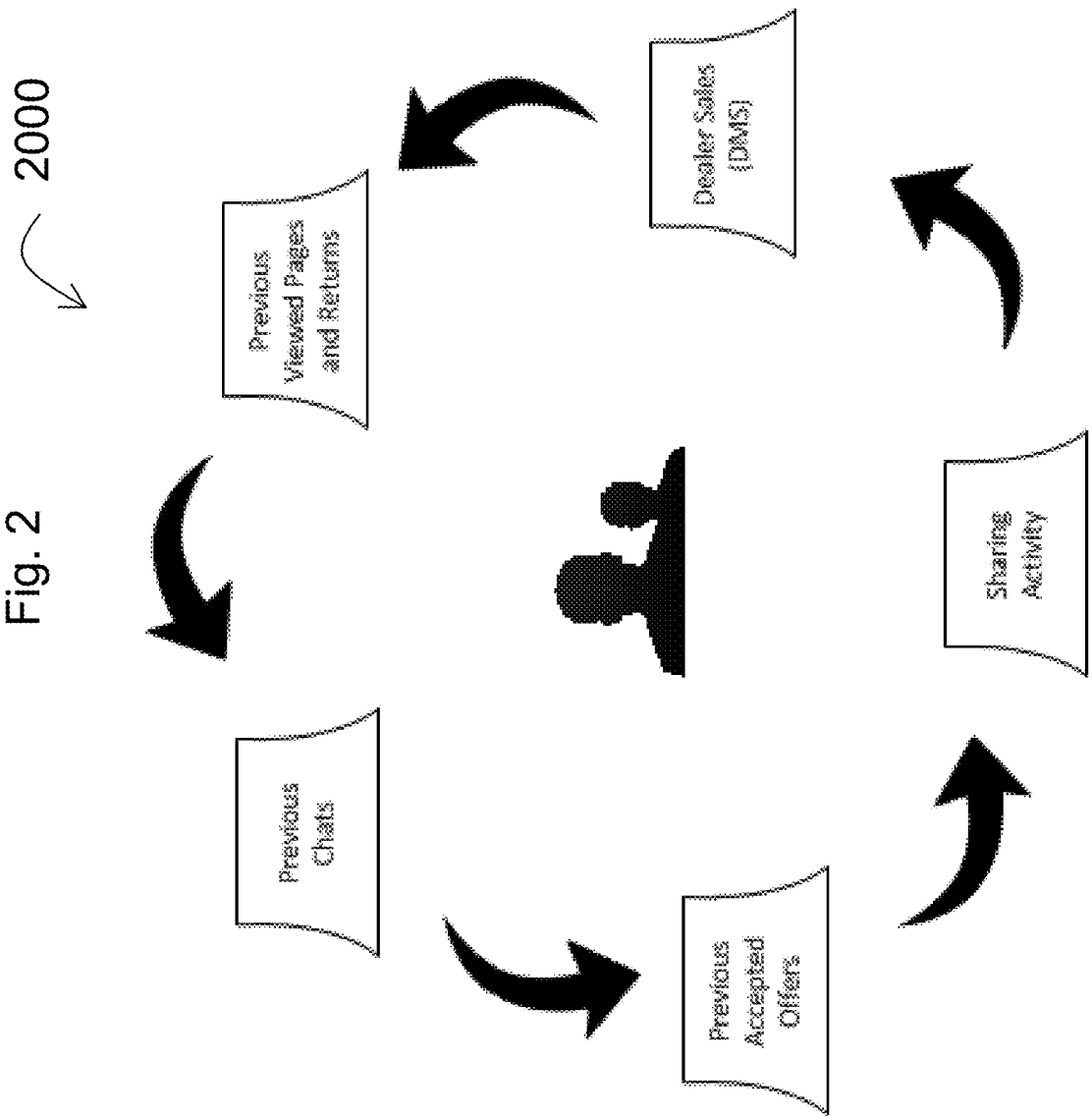
FIG. 2 is an exemplary concept of the behavior and scoring algorithms of the BEAST engine in accordance with a preferred embodiment of the present invention.

Turning to FIG. 2, in accordance with a preferred embodiment, the concept of the behavior and scoring algorithms of the BEAST engine 1420 is generally shown. The behavior and scoring algorithms of the BEAST engine 1420 include measuring and analyzing the level of visitor interaction with a website, and the level of visitor response to engagement. The visitor engagement includes, e.g., "Previous Viewed Pages and Returns," "Previous Chats," "Previous Accepted Offers," "Sharing Activity," and so on. The types of engagement may be expanded.

The BEAST engine 1420 enables the definitions of, assigns, and aggregates index scores as the visitors move through the elements of the website. The scores may also be reduced based on certain lack of activity. The BEAST engine 1420 keeps statistics on how these scores affect visitor engagement, conversion, loyalty, and how visitor behavior changes over time. The BEAST engine 1420 also keeps data on acquisition channels that generate the highest level of interaction with various site elements and conversion. As a result, the BEAST engine 1420 is able to tailor website engagement for each visitor based on the visitor experience as the visitor moves through key site elements, including the visitor experience for the entire network of the website lead generation server system 1400 as mentioned above.

Turning to FIG. 3, in accordance with a preferred embodiment, a scoring table 3000 of On-Site scoring indexes 3100 used by the BEAST engine 1420 is shown. The first column of the scoring table 3000 shows the visitor activities on a website that the BEAST engine 1420 tracks. The activities include, e.g., the number of times the visitor returns to the website ("Returns"), the time the visitor spends on a webpage on the website ("Time on page"), the time the visitor spends on the website ("Time on Site"), and so on. The types of activities may be added or removed. The second column of the scoring table 3000 shows the score value for each visitor activity. For example, a visitor who spends 5 minutes ("[set time]") on a website ("Time on Site") may be assigned a score of 5 ("[set value]"). The third column of the scoring table 3000 has a value of Yes or No. A Yes value indicates that there may be one or more of the same activity elements in the same scoring table 3000. For example, because the third column of the activity "Time on page" has a Yes value, the activity "Time on page" may be created more than once, e.g., twice. The first activity "Time on page" element may be assigned a "set time" of 10 seconds, and a "set value" of 1.5. The second activity "Time on page" element may be assigned a "set time" of 10 seconds, and a "set value" of 2.5. In this instance, it may indicate that when the visitor spends 10 seconds on the webpage, the visitor's score will increase by 1.5. If the visitor spends 20 seconds on the webpage, the visitor's score will increase by 2.5. The fourth column of the scoring table indicates the type of the stored value of column two. For example, for the "Time on page" element, "[set time]" is stored as a text string, and "[set value]" is stored as an integer.

Turning to FIG. 4, in accordance with a preferred embodiment, a scoring table 4000 of Off-Site scoring indexes 4100 used by the BEAST engine 1420 is shown. As mentioned above, the visitor experience for the entire network of the website lead generation server system 1400 (whenever and wherever the Toolbar is installed) is taken into account when creating the VEP. The Off-Site scoring index 4100 is similar to the On-Site scoring index 3100, but is available as a separate metric for instances where the off-site activity and behavior of the visitor need to be measured and analyzed. The first column of the scoring table 4000 shows the visitor activities outside of a website that the BEAST engine 1420 tracks. The activities include, e.g., a QR code or a URL that referred the visitor to the current website ("HTTP Referrer URL"), a marketing campaign that referred the visitor to the current website ("Campaign"), and so on. The types of activities may be added or removed. The second column of the scoring table 3000 shows the score value for each visitor activity. For example, the visitor who is referred to the current website by a previously defined URL ("[set URL]") may be assigned a score of 10 ("[set value]"). The third column of the scoring table 4000 has a value of Yes or No, and has a similar function as the third column of the scoring table 3000. A Yes value indicates that there may be one or more of the same activity elements in the same scoring table 4000. The fourth column of the scoring table 4000 indicates the type of the stored value of column two. For example, for the "HTTP Referrer URL" element, "[set URL]" is stored as a text string, and "[set value]" is stored as an integer.

Turning to FIG. 5, in accordance with a preferred embodiment, a scoring table 5000 of System scoring indexes 5100 used by the BEAST engine 1420 is shown. The first column of the scoring table 5000 shows the system and system parameters that the visitor to the website uses. The information (system and parameters) and IP address of the system may be obtained, e.g., from the visitor's browser HTTP headers. The types of systems and parameters may be added or removed. The second column of the scoring table 5000 shows the score value for each system and parameter. The third column of the scoring table 5000 has a value of Yes or No, and has a similar function as the third column of the scoring table 3000. A Yes value indicates that there may be one or more of the same system elements in the same scoring table 5000. The fourth column of the scoring table indicates the type of the stored value of column two. For example, a Windows 7 ("Configurable parameter") system may be assigned a score of 5 ("[set value]"), which is an integer.

Turning to FIG. 6, in accordance with a preferred embodiment, a scoring table 6000 of Location scoring indexes 6100 used by the BEAST engine 1420 is shown. The first column of the scoring table 6000 shows the geographic information of the visitor to the website. The information includes, e.g., Country, City, State, and so on. The geographic information may be captured and/or stored in the behavior database 1410, or in a geographic location database integrated with or coupled to the website lead generation server system 1400. The types of information may be added or removed. The second column of the scoring table 6000 shows the score value for each geographic information. The third column of the scoring table 6000 has a value of Yes or No, and has a similar function as the third column of the scoring table 3000. A Yes value indicates that there may be one or more of the same location elements in the same scoring table 6000. The fourth column of the scoring table indicates the type of the stored value of column two. For example, United State ("Country") may be assigned a score of 15 ("[set value]"), which is an integer.

Turning to FIG. 7, in accordance with a preferred embodiment, a scoring table 7000 of Demographic scoring indexes 7100 used by the BEAST engine 1420 is shown. The first column of the scoring table 7000 shows the demographic information of the visitor to the website. The demographic information may be obtained from another third-party service (e.g., Quantcast, Infochimps) via an API interface (e.g., XML, SOAP). The information includes, e.g., Male, Female, Income of $0-50K, $50-100K, No College, College, Caucasian, Asian, and so on. The types of information may be added or removed. The second column of the scoring table 7000 shows the score value for each demographic information. The third column of the scoring table 7000 has a value of Yes or No, and has a similar function as the third column of the scoring table 3000. A Yes value indicates that there may be one or more of the same demographic elements in the same scoring table 7000. The fourth column of the scoring table indicates the type of the stored value of column two. For example, a male visitor ("Male") may be assigned a score of 10 ("[set value]"), which is an integer.

As an example, in accordance with a preferred embodiment, when a user first visits a website, the BEAST engine 1420 creates four (or any other predetermined number) Visitor Engagement Profiles (VEPs), with one or more initial score assignments made and limits defined. A score scale of 0-100 is predetermined. The score scale may be divided into four groups and may include, e.g., Low Lead Value: score 0-25, Moderate Lead Value: score 26-50, High Lead Value: score 51-75, and Highest Lead Value: score 76-100. The Global Score limit, in this case, is 100. As the user browses through the pages of the website, the BEAST engine 1420 increases the score. If the user's score reaches, e.g., 34, according to the VEP configuration, the user is at "Moderate Lead Value." The user may spend a long time browsing the website, has two online chats, submits a lead form, but has not been active anywhere outside of the current website. For this example, the BEAST engine 1420 also does not have any demographic information on the user. In this case, the user's VEP has a score indicating "Moderately Lead Value." The Index is appended for each VEP to better define the visitor activity and create additional criteria which can be used for trigger configuration (e.g., "show this ad to all visitors with score 10-20"; or "show this ad to all visitors with score 10-20 for Demographic Index or System Index," thus skipping all other visitors with score 10-20 in other indexes).

If the above user is absent from the website for more than a predetermined period of time, e.g., hours, days, weeks, the BEAST engine 1420 may assign a penalty by reducing one or more scores in one or more indexes, by one or more predetermined values.

Figure 8:
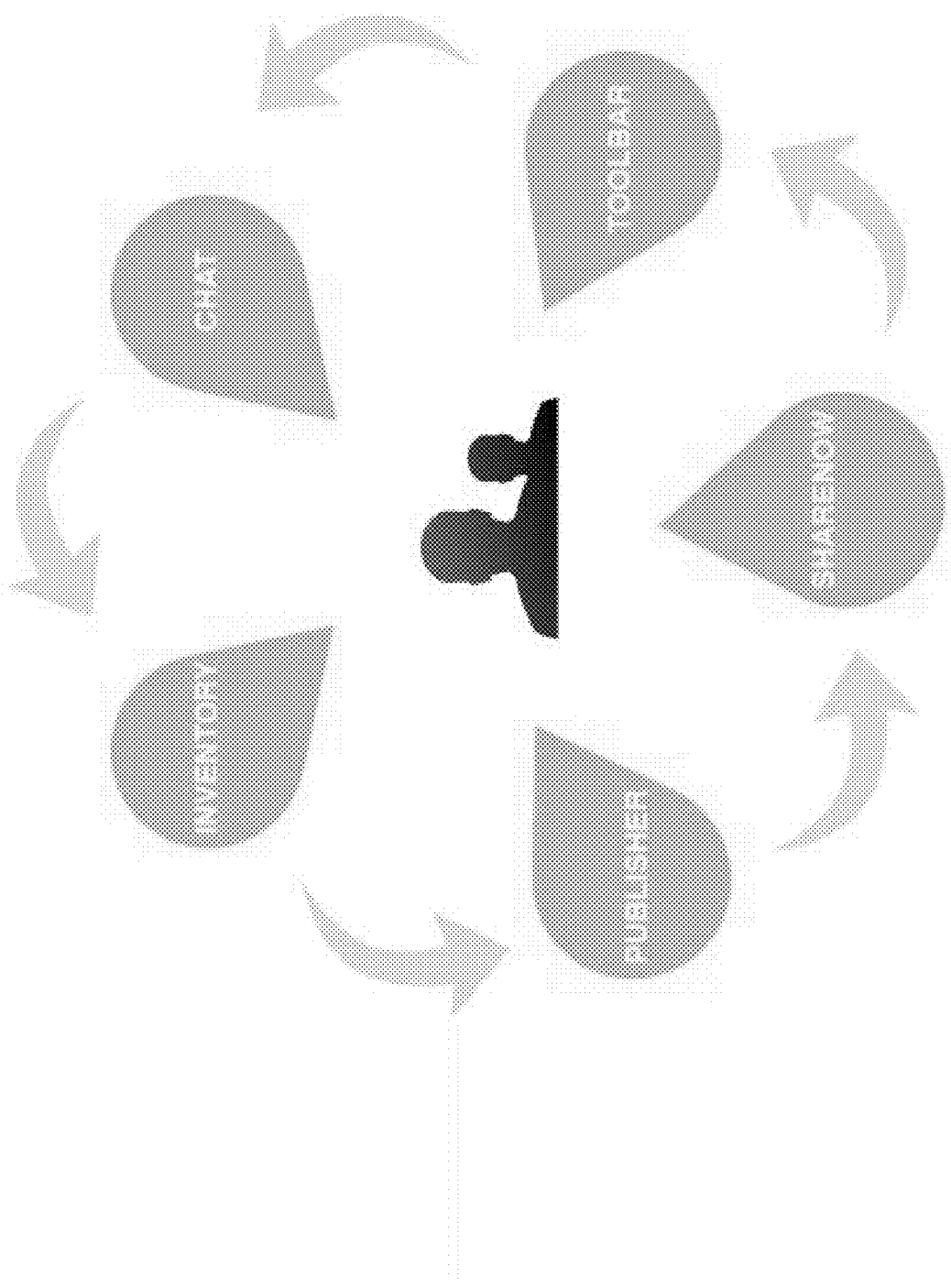
FIG. 8 is an exemplary diagram of the applications supported by the BEAST engine in accordance with a preferred embodiment of the present invention.

Turning to FIG. 8, in accordance with a preferred embodiment, website engagement applications that may be supported by the BEAST engine 1420 is generally shown. The engagement applications include, e.g., Publisher engagement, ShareNow engagement, Toolbar engagement, Chat engagement, Inventory engagement, and so on.

Figure 9:
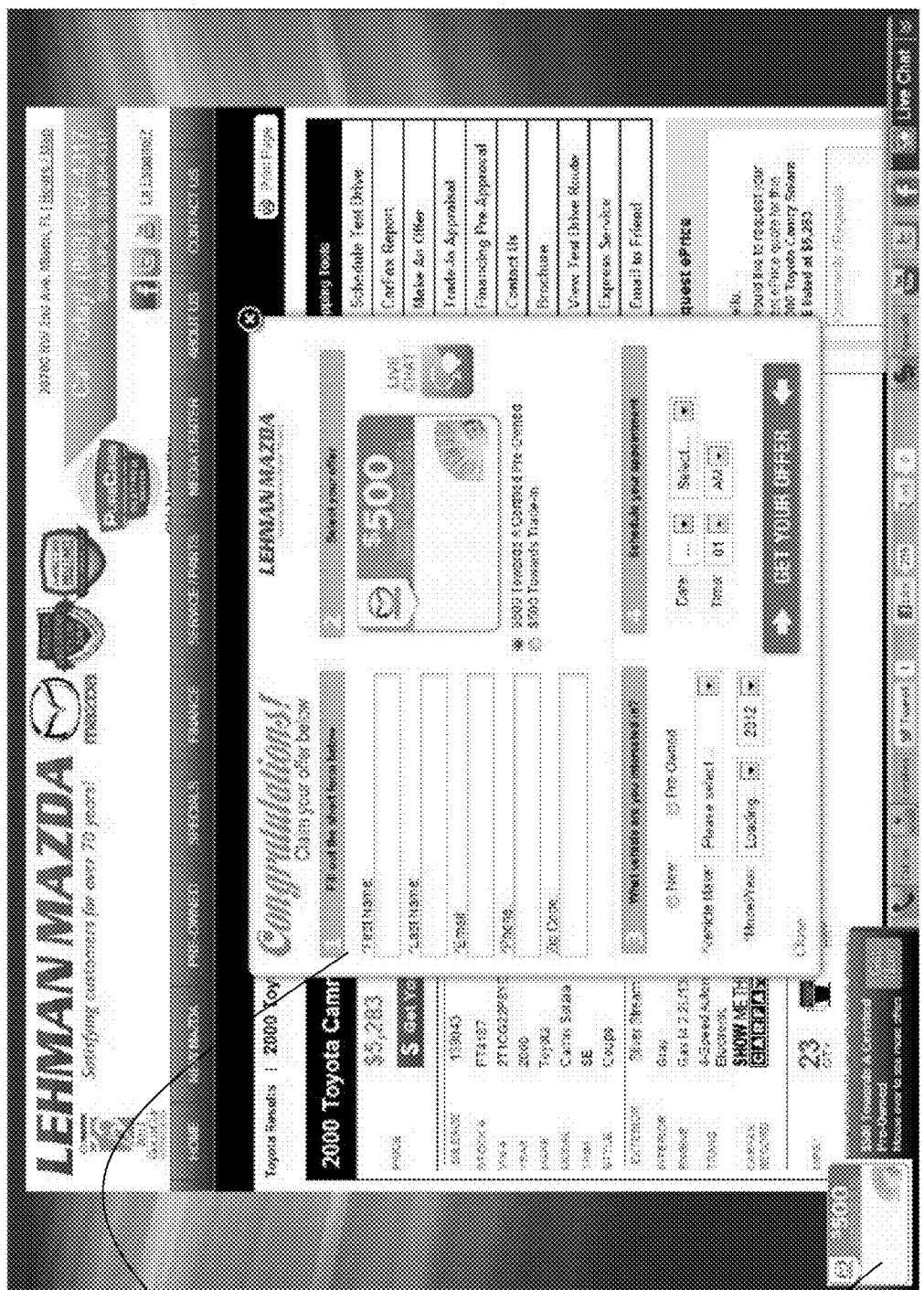
FIG. 9 is an exemplary user interface in accordance with a preferred embodiment of the present invention.

Turning to FIG. 9, in accordance with a preferred embodiment, an example of the Publisher engagement user interface 9000 is shown. The Publisher engagement user interface 9000 is powered by the BEAST engine 1420. The Publisher engagement generally publishes one or more relevant and targeted offers 9100/9200 matching individual browsing patterns of the visitors at the website. When visitors arrive at a website for the first time or as repeat visitors, the BEAST engine 1420 tracks, tags and scores their action. The BEAST engine 1420 analyzes their session data and identifies which elements of the website each visitor is mostly interested in. The scoring algorithms and any information about the visitors, e.g., from the VEPs, enable the BEAST engine 1420 to engage the visitors at the right time with the right offers. As a result, the visitors have a richer, more meaningful experience that results in increased conversions for the website owner. It is noted that the BEAST engine 1420 enables the display of the offers in a non-obstructive manner, e.g., offer 9200 is displayed in lower corner of the web page.

In another example, when an offer 9100/9200 is claimed by a visitor, the BEAST engine emails one or more vouchers to the visitor for redemption and the visitor's information is submitted to the website owner as a lead. The BEAST engine may deliver leads directly to website owner's Customer Relationship Management (CRM) software, Information Lifecycle Management (ILM) software, or Email system.

Figure 10:
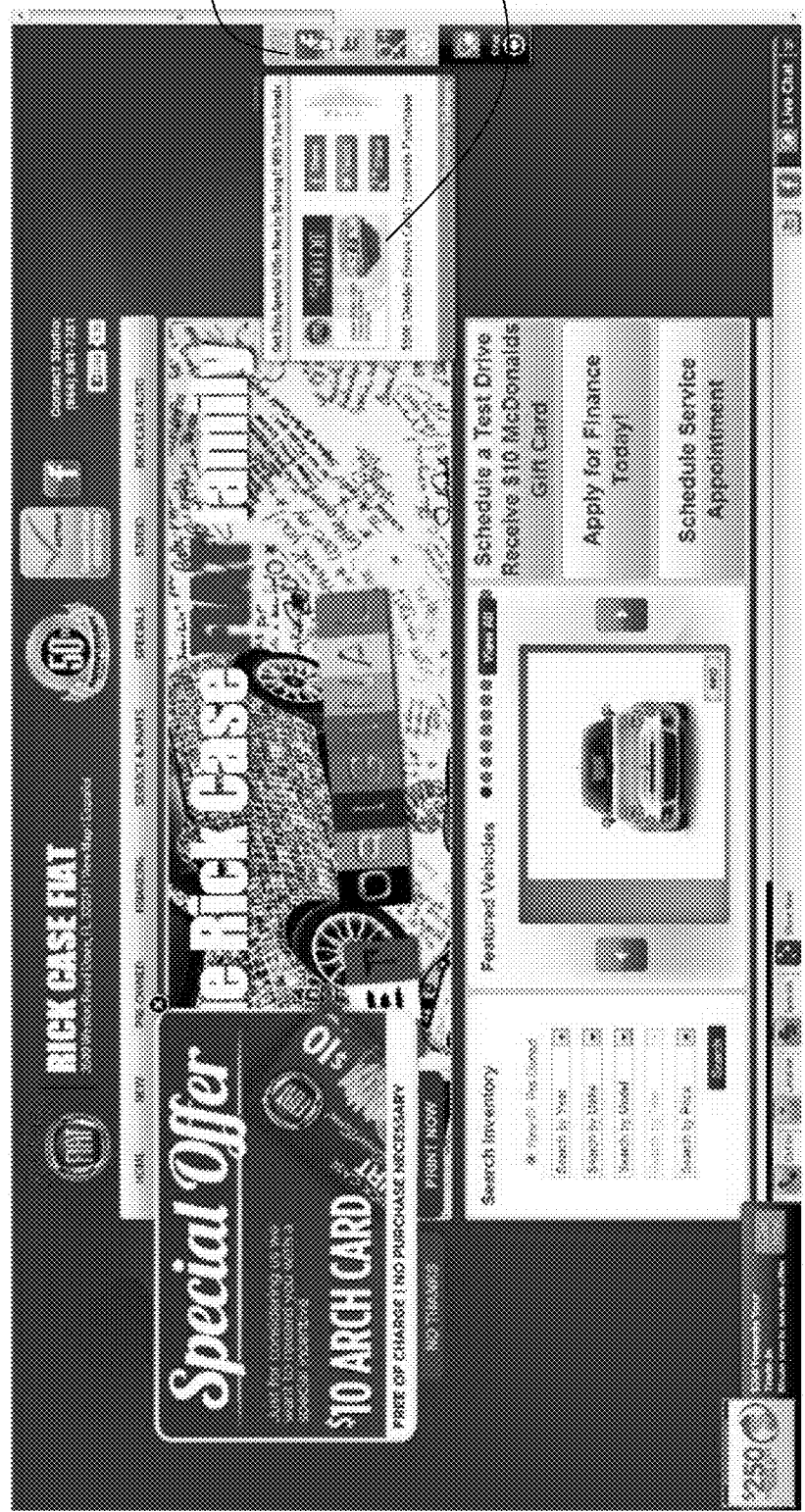
FIG. 10 is another exemplary user interface in accordance with a preferred embodiment of the present invention.

Turning to FIG. 10, in accordance with a preferred embodiment, an example of the ShareNow engagement user interface 10000 is shown. The ShareNow engagement user interface 10000 is powered by the BEAST engine 1420. ShareNow generally provides, for sharing through social media, relevant and targeted offers 10200 matching individual browsing patterns of the visitors at the website. When visitors arrive at a website for the first time or as repeat visitors, the BEAST engine 1420 tracks, tags and scores their action. The BEAST engine 1420 analyzes their session data and identifies which elements of the website each visitor is mostly interested in. The scoring algorithms and any information about the visitors, e.g., from the VEPs, enable the BEAST engine 1420 to provide the right offer 10200 to the visitor for sharing via social media such as Facebook, Google+, Twitter, and so on. It is noted that the BEAST engine 1420 enables the display of one or more social media network icons in a non-obstructive manner, e.g., the social media network bar 10100 is displayed at the right edge of the web page. The BEAST engine 1420 enables sharing of offer 10200 by sending a link to the landing page of the offer 10200 to the social media account or address given by the visitor.

Figure 11:
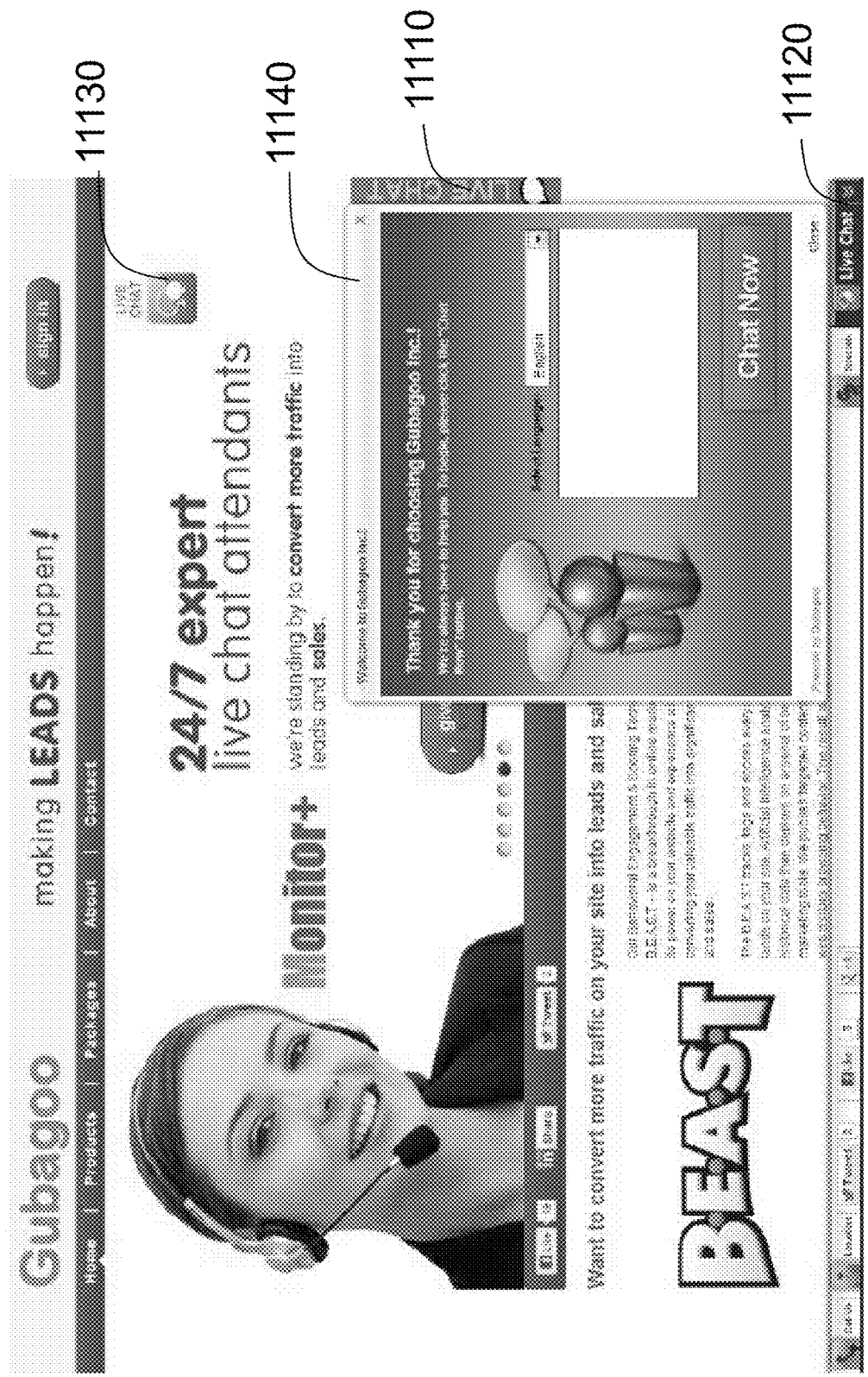
FIG. 11 is another exemplary user interface in accordance with a preferred embodiment of the present invention.

Turning to FIG. 11, in accordance with a preferred embodiment, an example of the Chat engagement user interface 11000 is shown. The Chat engagement user interface 11000 is powered by the BEAST engine 1420. When visitors arrive at a website for the first time or as repeat visitors, the BEAST engine 1420 tracks, tags and scores their action. The BEAST engine 1420 analyzes their session data and identifies which elements of the website each visitor is mostly interested in. The scoring algorithms and any information about the visitors, e.g., from the VEPs or CRM software, enable the BEAST engine 1420 to provide the right information to the live chat attendant in order to improve chat interactions with the visitors and increase lead conversions for the website owner. The BEAST engine 1420 enables the Chat engagement display in multiple ways. For example, the BEAST engine 1420 enables the display of a Chat icon (or button) in a non-obstructive manner, e.g., the Chat icon 11110 is displayed at the right edge of the web page and the Chat icon 11120 is displayed in a toolbar at the bottom edge. A Chat icon 11130 may also be displayed on page overlays, in the website headers and/or website elements (not shown). A Chat window (similar to window 11140) may be displayed when an operator has engaged visitor and the visitor accepted Chat. Or a Chat window (similar to window 11140) may be displayed when the BEAST engine automatically, driven by the scoring algorithms, engages the visitor and the visitor accepted Chat. The visitor may select the Chat icon to enter a chat session. After a Chat engagement, the Chat session is closed, a transcript form is displayed (not shown), and the BEAST engine 1420 offers the visitor the option to receive a copy of the Chat transcript via email. During a Chat session, the chat operator preferably pushes one or more offers towards the visitor. When the visitor accepts one or more offers, the BEAST engine 1420 provides a lead form for the visitor to fill out without having to close the session. This engagement benefits from the fact that the operator is online to engage and answer the visitor's questions.

Figure 12:
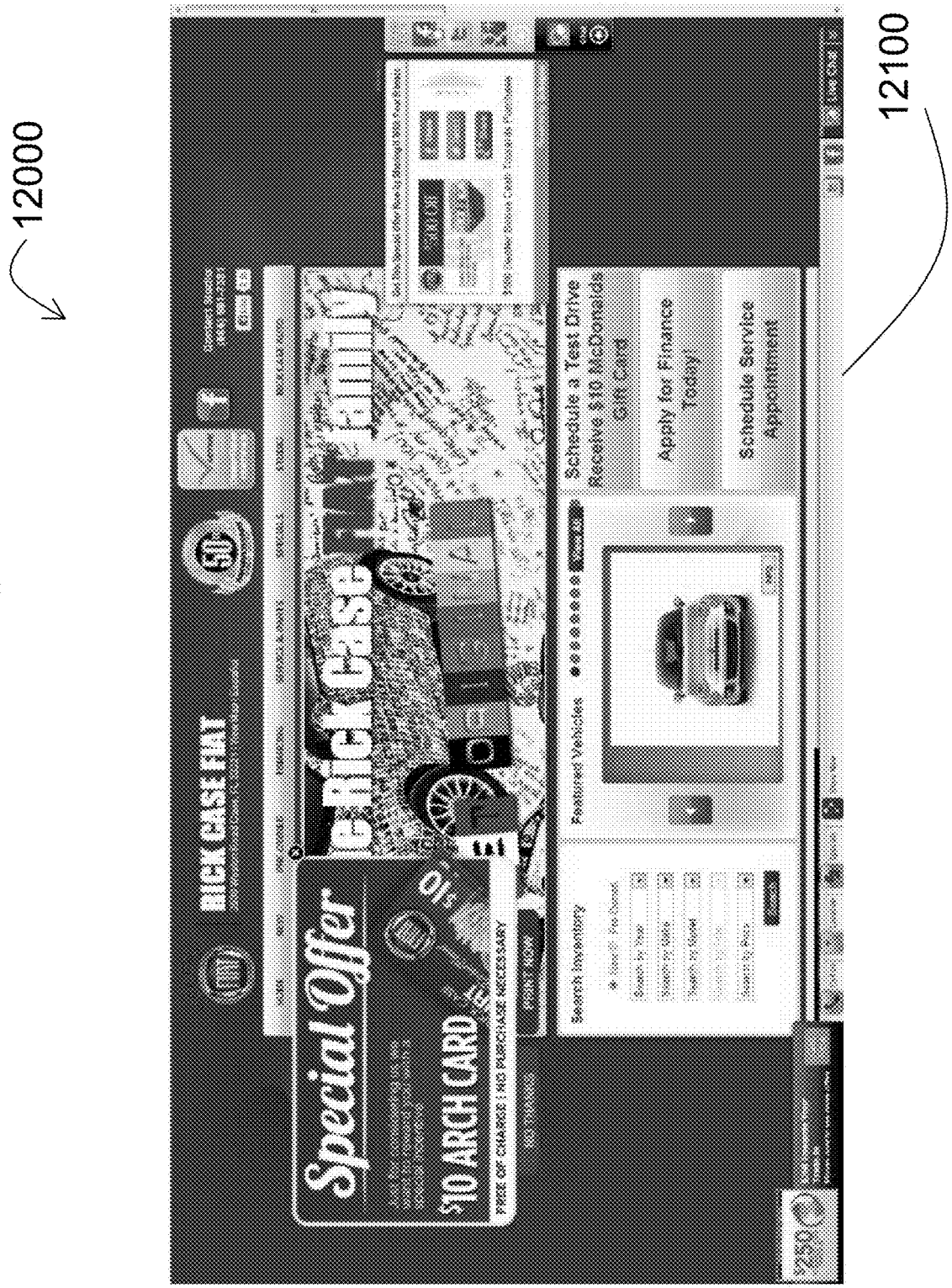
FIG. 12 is another exemplary user interface in accordance with a preferred embodiment of the present invention.

Turning to FIG. 12, in accordance with a preferred embodiment, an example of the Toolbar engagement user interface 12000 is shown. The Toolbar engagement user interface 12000 is powered by the BEAST engine 1420. When visitors arrive at a website for the first time or as repeat visitors, the BEAST engine 1420 tracks, tags and scores their action. The BEAST engine 1420 analyzes their session data and identifies which elements of the website each visitor is mostly interested in. The scoring algorithms and any information about the visitors, e.g., from the VEPs, enable the BEAST engine 1420 to provide the right engagement tools for displaying in the Toolbar 12100. Having the right engagement tools will improve interactions with the visitors and increase lead conversions for the website owner. The BEAST engine 1420 enables the display of the Toolbar in a non-obstructive manner, e.g., the Toolbar 12100 is displayed at the bottom edge of the web page. The BEAST engine 1420 delivers the Toolbar 12100, e.g., via a simple JavaScript code that must be installed in the website source code. This creates a "channel" through which all visitor information is processed, and effectively makes the website part of the network of the website lead generation server system 1400. Moreover, the Toolbar may serve as a platform for all toolbar-related applications and may include a publicly accessible application program interface ("API") for third party developers.

Preferred Processes

Figure 13:
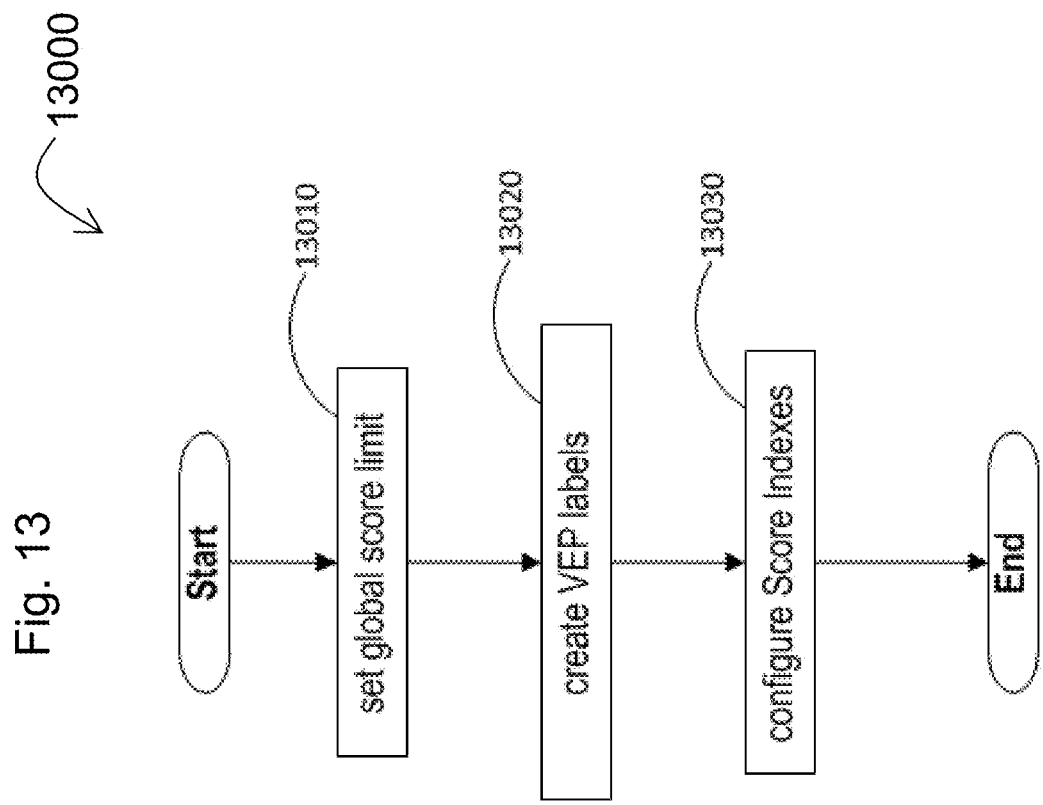
FIG. 13 is an exemplary process of a website lead generation system in accordance with a preferred embodiment of the present invention.

Turning to FIG. 13, a description of the operation 13000 of the website lead generation server system 1400 is shown. A scoring system is set up in advance, e.g., by website operator and/or developer, as shown in operation 13000, to be applied to each visitor to a website engaged with the website lead generation server system 1400. A global score limit is first set (Action Block 13010), multiple VEPs are then created with one or more VEP labels, e.g., Male, Female, Income (Action Block 13020), and score indexes are created and configured (Action Block 13030). Scores in accordance with the scoring system are then applied to website visitors as they browse. VEP labels are also assigned, and may change as visitors continue browsing as will be described in more detail below. These steps may be performed manually by the website owner or administrator. When a visitor arrives at a website for the first time, as the information flow begins, the BEAST engine 1420 selects one or more VEPs matching the visitor. As the visitor browses through the website (and/or the network of the website lead generation server system 1400 outside the current website), the user's profile may change because more information is available for the BEAST engine 1420 to analyze. As a result, the BEAST engine 1420 may select more accurate VEP(s) for the user.

Turning to FIG. 14*a*, a description of the operation 14000 of the Publisher engagement supported by the BEAST engine 1420 is shown. Generally, as mentioned above, the Publisher engagement publishes one or more relevant and targeted offers matching individual browsing patterns of a visitor at the website. Any information received from the visitor via offer or lead form is submitted to the website owner as a lead.

Upon a visitor loading, or entering, a page of the website (Action Block 14010), the BEAST engine 1420 calculates a Publisher response (FIG. 14*b*) based on the algorithms of the BEAST engine 1420 (Action Block 14011). The calculation provides one or more relevant and targeted offers matching the visitor's browsing patterns. The BEAST engine 1420 then engages the visitor by providing for display one or more offers, and for accepting input from the visitor (Action Block 14012). If the visitor does not complete an offer/lead form (Decision Block 14013), the BEAST engine 1420 updates, in the selected Visitor Engagement Profile (VEP), the visitor data (Action Block 14015) and the Publisher data (Action Block 14016) with any information gathered from the engagement with the visitor. The Publisher data may include, e.g., Publisher engagement configuration, offers, ads, run-time information and settings, statistics and logs, and so on. The BEAST engine 1420 may use this data to update visitor tracking information and/or scoring configuration.

If input is received from the visitor, e.g., the visitor completes an offer/lead form, (Decision Block 14013), the BEAST engine 1420 submits the lead information to the website owner (Action Block 14014). In the context of vehicle leads, such leads are submitted via lead forms dynamically generated by user action, such as a click on a "vehicle matching tool" shown in the user interface. These leads preferably include a label identifying the type of lead, e.g., "vehicle," to enable reporting and efficient performance in the database queries. Such lead form may include the following: all vehicles viewed by the user visiting a dealer website, all vehicles recommended for the user based on user activity such as browsing history and available dealer inventor, and corresponding vehicle images. The BEAST engine 1420 updates the visitor data (Action Block 14015) with the visitor input and decision information, and so on, in the Visitor Tracking Database (behavior database 1410). The BEAST engine 1420 also updates the Publisher data (Action Block 14016) with the user decision information, run-time information and settings, statistics and logs, and so on. The BEAST engine 1420 exits Publisher engagement when the visitor leaves the website (Decision Block 14019).

Figure 14B:
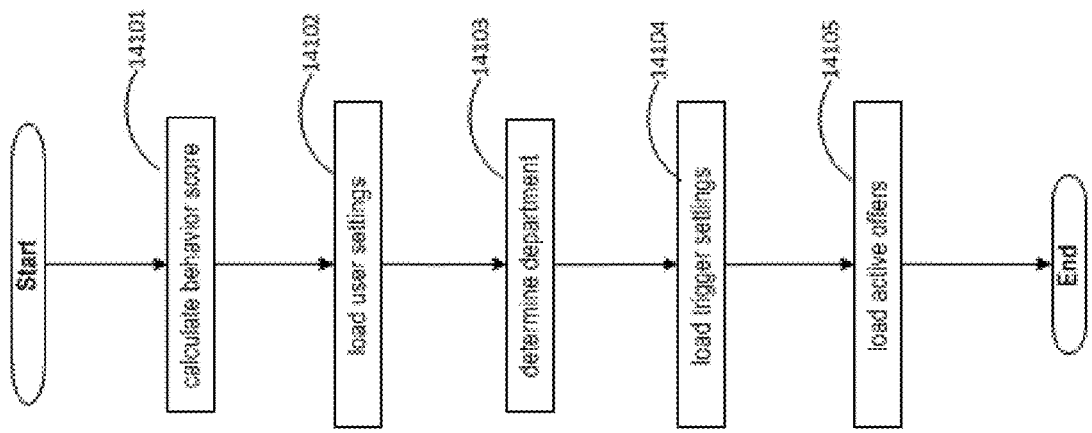
FIG. 14b is another exemplary process of a website lead generation system in accordance with a preferred embodiment of the present invention.

Turning to FIG. 14b, a description of the operation 14100 of the Publisher engagement of the BEAST engine 1420 is shown. The operation 14100 shows further the steps of calculating a Publisher response (FIG. 14a, Action Block 14011) in order to find one or more relevant and targeted offers. The BEAST engine 1420 calculates a behavior score of the visitor (Action Block 14101). The calculation includes, e.g., analyzing the visitor activity through visited pages, chats, accepted offers, Toolbar clicks, returns, scoring penalty, visited scored URLs, and so on. The calculation helps in the selection of the best matching one or more VEPs for the visitor. The calculation is preferably performed every time the visitor loads the website page. The BEAST engine 1420 also loads the settings of the visitor (Action Block 14102). The settings include, e.g., current website URL, visitor account, visitor's browser cookies, and the visitor's browsing history, if any, as saved in the behavior database 1410. The BEAST engine 1420 matches the website URL the visitor is currently on against the URLs in the website departments that were created in the system (Action Block 14103). Any trigger settings are then loaded (Action Block 14104). The trigger settings include, e.g., what ad(s) will be displayed and in what succession, when ad(s) will be displayed, how many times ad(s) will be displayed, on what website URL's ad(s) will be displayed, and so on. Based on the above data and information, the BEAST engine 1420 determines and loads one or more relevant and targeted offers (Action Block 14105) for engagement with the visitor (FIG. 14a, Action Block 14012).

Figure 15A:
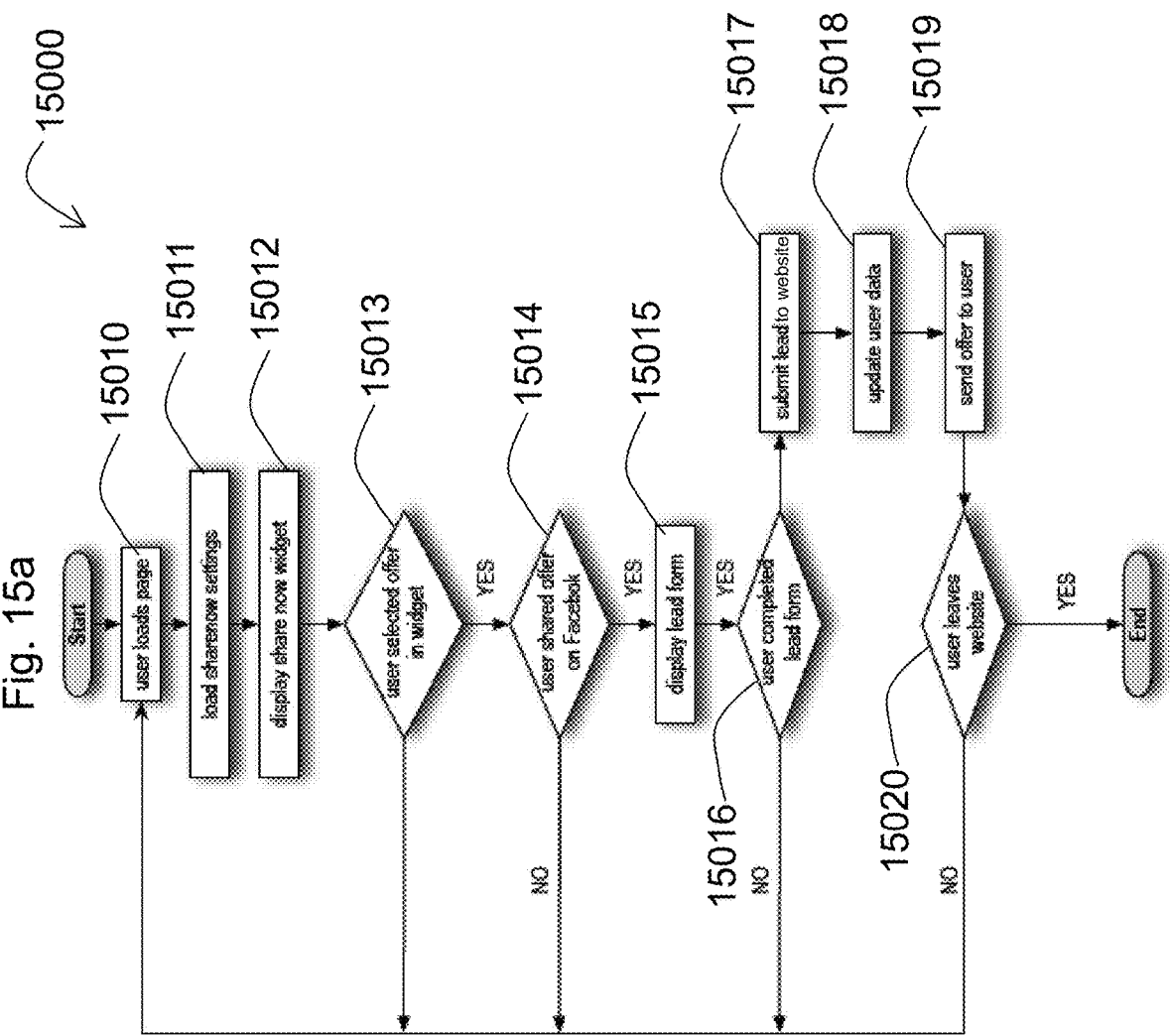
FIG. 15a is another exemplary process of a website lead generation system in accordance with a preferred embodiment of the present invention.

Turning to FIG. 15a, a description of the operation 15000 of the ShareNow engagement supported by the BEAST engine 1420 is shown. Generally, as mentioned above, the ShareNow engagement provides, for sharing through social media and networks, relevant and targeted offers matching individual browsing patterns of the visitors at a website. Any information received from the visitors via offers or lead forms is submitted to the website owner as leads.

Upon a visitor loading, or entering, a page of the website (Action Block 15010), the BEAST engine 1420 loads the ShareNow engagement settings, e.g., a bar of social media icons (Action Block 15011), and provides ShareNow widgets, e.g., a pop-up window including an offer, for display (Action Block 15012). If the visitor selects the offer in the ShareNow widget (Decision Block 15013), and if the visitor also selects to share the offer on a social media network, e.g., Facebook (Decision Block 15014), the BEAST engine 1420 provides a lead form for display (Action Block 15015). If the visitor completes the lead form (Decision Block 15016), the BEAST engine 1420 submits the lead information to the website owner (Action Block 15017). The BEAST engine 1420 updates the visitor data with the visitor input and decision information, and so on, in the Visitor Tracking Database (behavior database 1410). (Action Block 15018). The BEAST engine 1420 then sends the selected offer to the visitor (Action Block 15019). The BEAST engine 1420 exits ShareNow engagement when the visitor leaves the website (Decision Block 15020).

Turning to FIG. 15b, a description of the operation 15100 of the ShareNow engagement of the BEAST engine 1420 in response to a visitor from a social media network is shown. As mentioned above, when a visitor to the website selects to share an offer, the BEAST engine 1420 sends the selected offer to the intended recipient (FIG. 15a, Action Block 15019). The message sent by the BEAST engine 1420 includes a link to the website of the offer. The BEAST engine 1420 incorporates a unique code in the shared offer link. When the social media recipient loads the social media page (Action Block 15110) and receives the message, the recipient may click on the link included in the shared offer (Action Block 15111). The recipient is then transferred to the website (Action Block 15112). At this point, the recipient becomes a visitor to the website. In response, the BEAST engine 1420 provides a lead form for display (Action Block 15113). When the link is used to transfer the recipient to the website, the BEAST engine 1420 parses the link and extracts the code (as described above) which uniquely identifies the offer (lead form). If the visitor completes the lead form, (Decision Block 15114), the BEAST engine 1420 submits the lead information to the website owner (Action Block 15115), updates the visitor data in the Visitor Engagement Profile (VEP) (Action Block 15117) with new input information and any information gathered from the engagement with the visitor. The BEAST engine 1420 exits ShareNow engagement when the visitor leaves the website (Decision Block 15118).

Figure 16A:
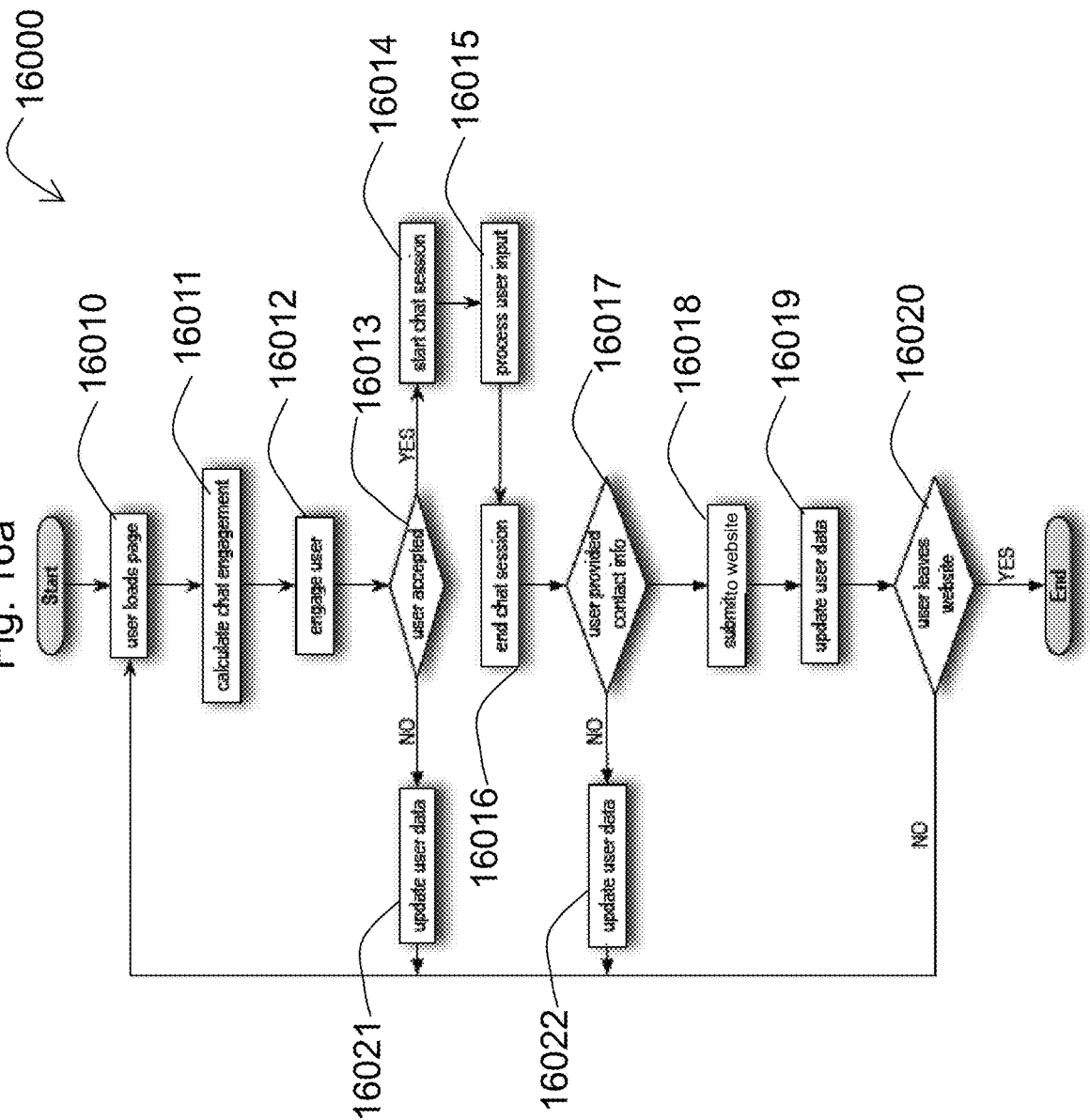
FIG. 16a is another exemplary process of a website lead generation system in accordance with a preferred embodiment of the present invention.

Turning to FIG. 16a, a description of the operation 16000 of the Chat engagement supported by the BEAST engine 1420 is shown. Generally, as mentioned above, the Chat engagement provides the right information to the live chat attendant in order to improve chat interactions with the visitors.

Upon a visitor loading, or entering, a page of the website (Action Block 16010), the BEAST engine 1420 calculates a Chat engagement response (FIG. 16b) based on the algorithms of the BEAST engine 1420 (Action Block 16011). The BEAST engine 1420 then engages the visitor by providing a Chat invitation window for display (Action Block 16012). If the visitor does not accept the Chat invitation (Decision Block 146013), the BEAST engine 1420 updates the visitor data in the Visitor Engagement Profile (VEP) (Action Block 16021) with any information gathered from the engagement with the visitor. If the visitor accepts the Chat invitation, the BEAST engine 1420 starts a Chat session with the visitor (Action Block 16014) and processes input from the visitor (Action Block 16015) until the Chat session ends (Action Block 16016).

If the visitor did not provide any contact information during the Chat session (Decision Block 16017), the BEAST engine 1420 updates the visitor data (Action Block 16022) with any new information gathered during the Chat session with the visitor. If the visitor provided contact information during the Chat session (Decision Block 16017), the BEAST engine 1420 submits the contact information to the website owner (Action Block 16018). The BEAST engine 1420 updates the visitor data (Action Block 16019) with the visitor input and decision information, and so on, in the Visitor Tracking Database (behavior database 1410). The BEAST engine 1420 exits Chat engagement when the visitor leaves the website (Decision Block 16020).

Turning to FIG. 16b, a description of the operation 16100 of the Chat engagement supported by the BEAST engine 1420 is shown. The operation 16100 shows further the steps of calculating a Chat engagement response (FIG. 16a, Action Block 16011). The BEAST engine 1420 calculates a behavior score of the visitor (Action Block 16101). The calculation includes, e.g., analyzing the visitor activity through visited pages, chats, accepted offers, Toolbar clicks, returns, scoring penalty, visited scored URLs, and so on. The calculation helps in the selection of the best matching one or more VEPs for the visitor. The calculation may be performed every time the visitor loads the website page. The BEAST engine 1420 also loads the settings of the visitor (Action Block 16102). The settings include, e.g., current website URL, visitor account, visitor's browser cookies, and the visitor's browsing history, if any, as saved in the behavior database 1410. The BEAST engine 1420 makes other determinations (Action Block 16103) including the current page URL and loading department settings from the behavior database 1410. The BEAST engine 1420 then loads Chat application settings (Action Block 16104) for engagement with the visitor (FIG. 16a, Action Block 16012).

Figure 17:
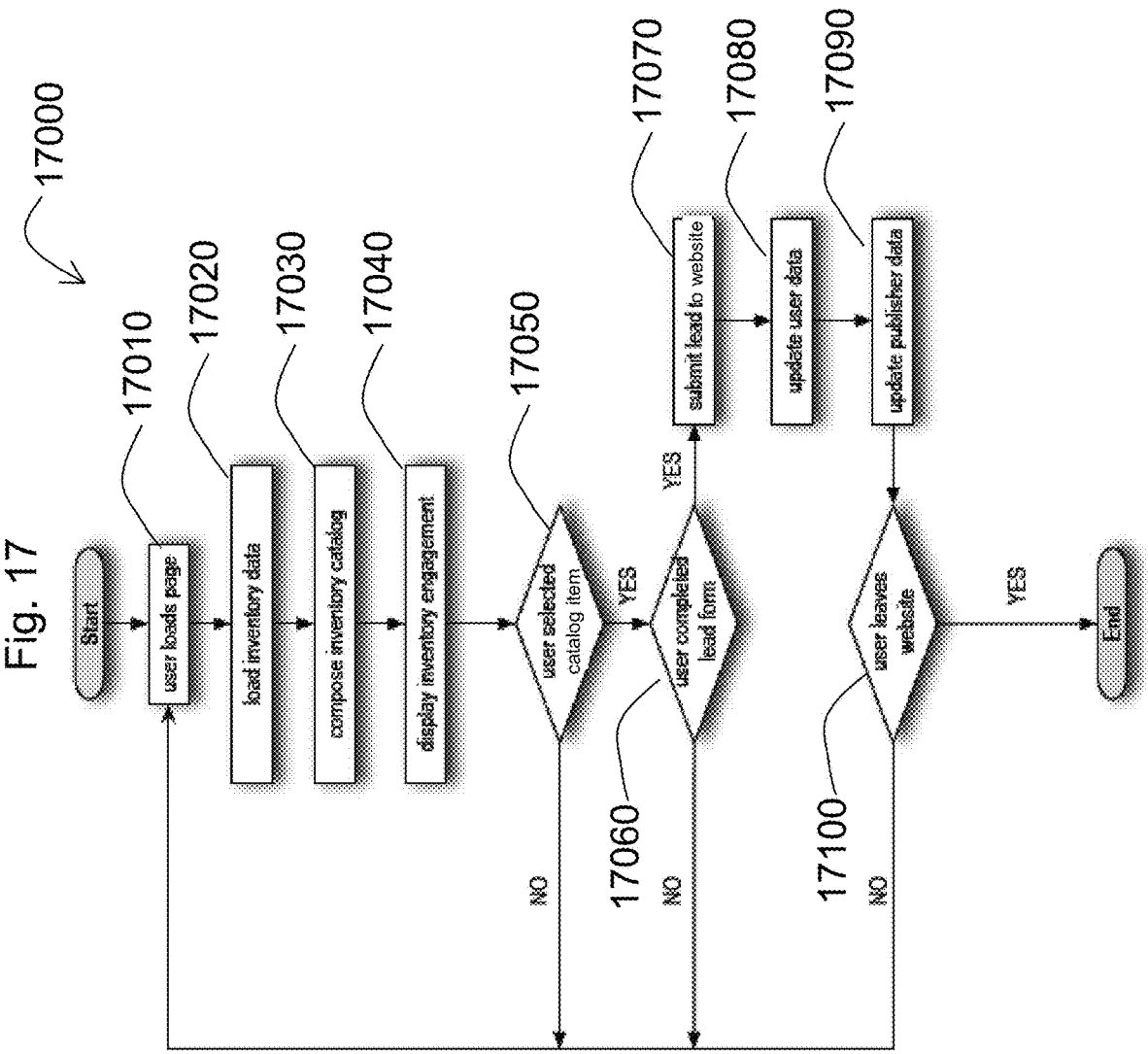
FIG. 17 is another exemplary process of a website lead generation system in accordance with a preferred embodiment of the present invention.

Turning to FIG. 17, a description of the operation 17000 of the Inventory engagement supported by the BEAST engine 1420 is shown. Generally, the Inventory engagement publishes one or more relevant and targeted lead forms matching individual browsing patterns of a visitor at the website. Any information received from the visitor via a lead form is submitted to the website owner as a lead.

Upon a visitor loading, or entering, a page of the website (Action Block 17010), the BEAST engine 1420 loads inventory data, e.g., from the website inventory data (Action Block 17020), and composes inventory catalog (Action Block 17030). The inventory catalog may be composed with product selection tailored for the current visitor based on the visitor's one or more VEPs and previously viewed products on the same website and on the network of the website lead generation server system 1400. The BEAST engine 1420 engages the visitor (Action Block 17040) by providing one or more relevant and targeted inventory items and one or more lead forms based on the algorithms of the BEAST engine 1420. This engagement may include, e.g., showing page overlay or other visual engagement that will display the created product inventory list to the visitor. If the visitor selects an inventory item (Decision Block 17050) and completes a lead form (Action Block 17060), the BEAST engine 1420 submits the lead information to the website owner (Action Block 17070). The BEAST engine 1420 then updates the visitor data (Action Block 17080) and the Publisher data (Action Block 17090) with the lead information and any other new information gathered during the inventory engagement session with the visitor (the update steps are similar to those described in FIG. 14a). The BEAST engine 1420 exits Chat engagement when the visitor leaves the website (Decision Block 17100).

Figure 18:
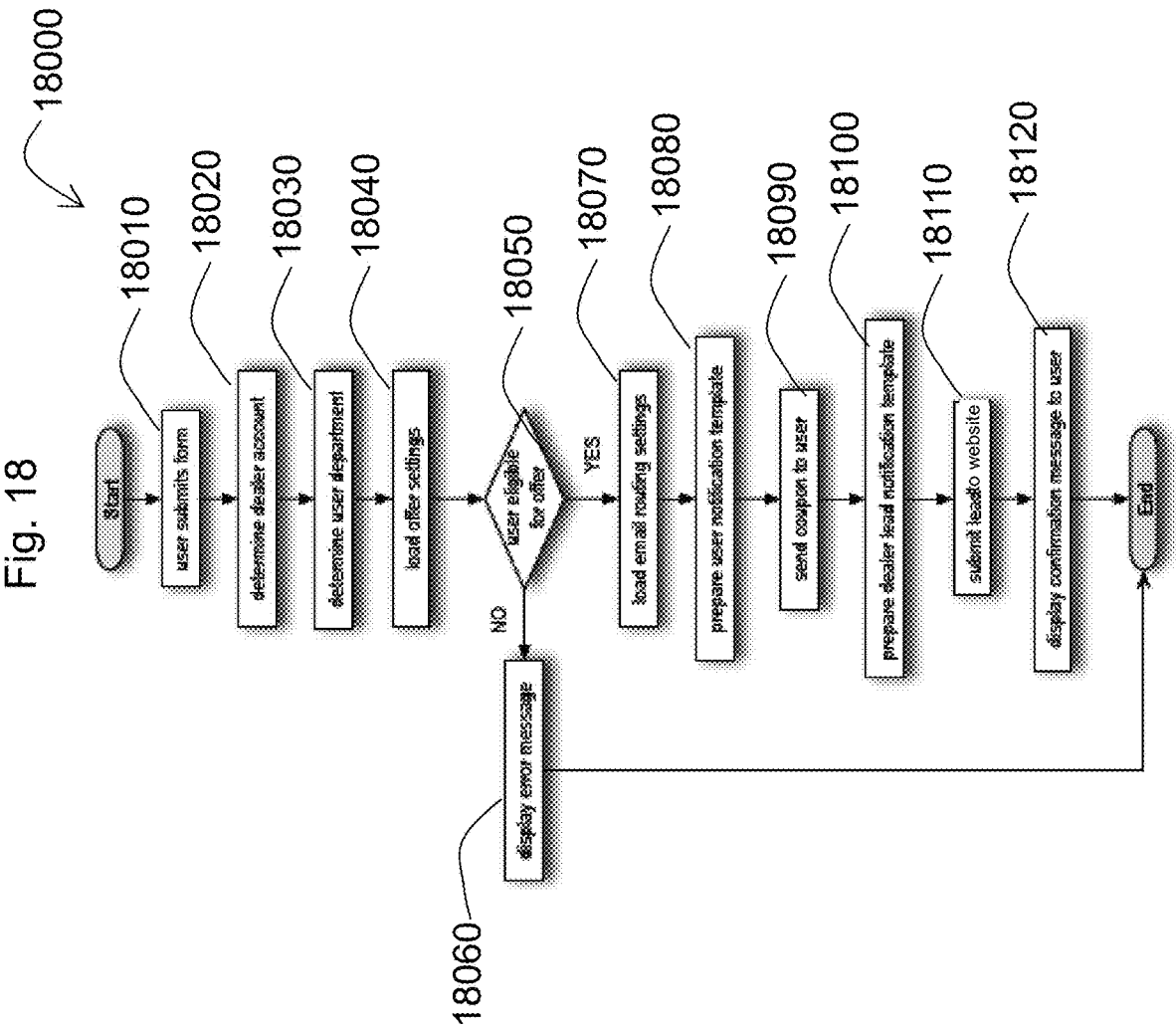
FIG. 18 is another exemplary process of a website lead generation system in accordance with a preferred embodiment of the present invention.

Turning to FIG. 18, a description of the operation 18000 of the BEAST engine 1420 is shown. Operation 18000 shows in general a lead submission process. Upon receiving a lead form from a visitor (Action Block 18010), the BEAST engine 1420 determines a website account (Action Block 18020), e.g., by analyzing the Toolbar code to determine the website domain and website account, and determines a user (visitor) department (Action Block 18030), e.g., by matching the website URL against the URLs in the website departments. The BEAST engine 1420 also loads the offer settings (Action Block 18040) to determine whether the visitor is eligible for the offer (Decision Block 18050). If the visitor is not eligible for the offer, the BEAST engine 1420 provides an error message for display (Action Block 18060). If the visitor is eligible for the offer, the BEAST engine 1420 loads the email routing settings (Action Block 18070), e.g., by reading website department settings from the Client Accounts & System Setting Database (behavior database 1410) in order to determine the email address(es) the next lead will be sent to, and prepares a user notification template (Action Block 18080), e.g., by reading the Client Accounts & System Setting Database (behavior database 1410) and using the appropriate HTML template. The BEAST engine 1420 then sends one or more coupons to the visitor (Action Block 18090). The BEAST engine 1420 then prepares a lead notification template (Action Block 18100) and submits to the website owner (Action Block 18110). The submission may be done using the email format selected (e.g., TXT, ADF, or both) based on the department settings, and sent to an SMTP server which then sends the submission to the recipient address. The BEAST engine 1420 also provides a confirmation message for display (Action Block 18120).

Turning to FIG. 19, a description of operation 19000 of the BEAST engine 1420 is shown in the context of marketing and selling vehicles. When a user loads a webpage operatively coupled to the BEAST engine (as described above) searching for a vehicle (Action Block 19010), the BEAST engine 1420 determines the current loaded webpage's URL and parses it to extract what vehicle information the user is searching for (Action Block 19020). Because different website vendors will have different URL encoding formats, it would be preferable to have the website vendor's format included in system 1400. The extracted vehicle information is then compared with trigger settings for that user, which may include a history of previously searched for vehicles by that user. If a match is found, system 1400 will load and search for dealer vehicle inventory (Action Block 19030) to make sure the extracted vehicle information is present in the dealer's active inventory (Action Block 19040). Criteria used to establish a correct vehicle match in triggers may include: vehicle year, make, model, VIN, stock number, and where the coupon should be displayed, e.g., vehicle search and/or vehicle detail information section.

Figure 19A:
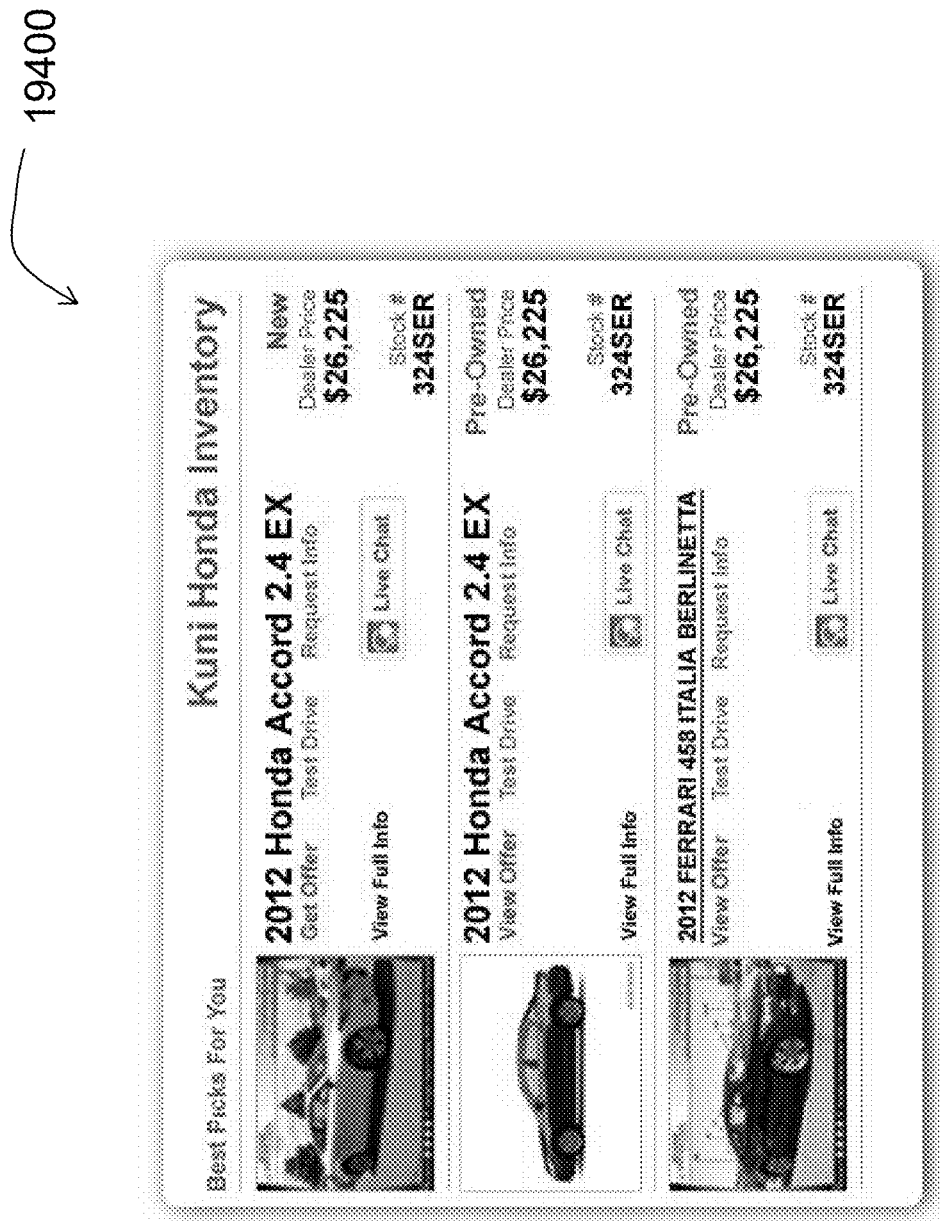
FIG. 19a is another exemplary engagement interface in accordance with a preferred embodiment of the present invention.

Once a match is found with available inventory, a targeted advertisement is generated and displayed, such as that shown in FIG. 19a (user interface 19400) (Action Block 19050). Other engagement types such as those described above may be used to show relevant vehicle inventory as well for engagement with the visitor. If the visitor selects an inventory item (Decision Block 19060) and completes a lead form (Decision Block 19070), the BEAST engine 1420 submits the lead information to the website owner/dealer (Action Block 19080). The BEAST engine 1420 then updates the visitor data (Action Block 19090) and the Publisher data (Action Block 19100) with the lead information and any other new information gathered during the inventory engagement session with the visitor (the update steps are similar to those described in FIG. 14a). The BEAST engine 1420 exits engagement when the visitor leaves the website (Decision Block 19110).

Figure 20:
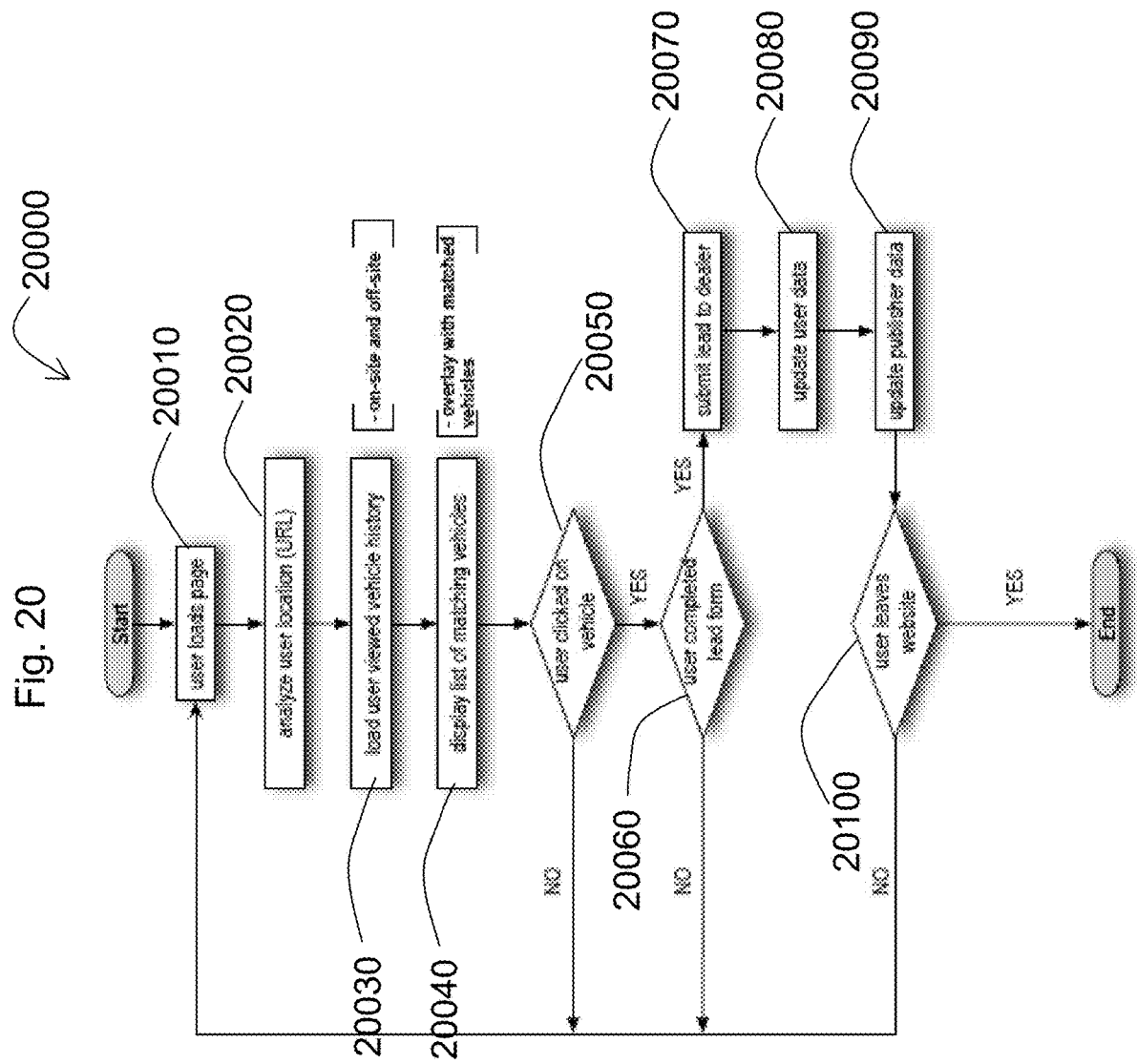
FIG. 20 is another exemplary process of a website lead generation system in accordance with a preferred embodiment of the present invention.

Turning to FIG. 20, a description of operation 20000 of the BEAST engine 1420 is shown in the context of marketing and selling vehicles. When a user loads a webpage operatively coupled to the BEAST engine (as described above) searching for a vehicle (Action Block 20010), the BEAST engine 1420 determines the current loaded webpage's URL (Action Block 20020). Further, the BEAST engine 1420 collects data on the viewed vehicle by collecting off-site and on-site user browsing history (Action Block 20030). With regard to off-site user activity, if one of the engagement tools above is active, e.g., the toolbar shown in FIG. 12, the toolbar may continue to collect data regarding all user activity, beyond activity on the particular web page loaded. With the collected data, BEAST engine 1420 is able to provide the user vehicle suggestions, using the methodologies described above, and present them using an engagement tool, such as those described above (Action Block 20040).

If the visitor selects an inventory item (Decision Block 20050) and completes a lead form (Decision Block 20060), the BEAST engine 1420 submits the lead information to the website owner/dealer (Action Block 20070). The BEAST engine 1420 then updates the visitor data (Action Block 20080) and the Publisher data (Action Block 20090) with the lead information and any other new information gathered during the inventory engagement session with the visitor (the update steps are similar to those described in FIG. 14a). The BEAST engine 1420 exits engagement when the visitor leaves the website (Decision Block 20100).

Figure 21:
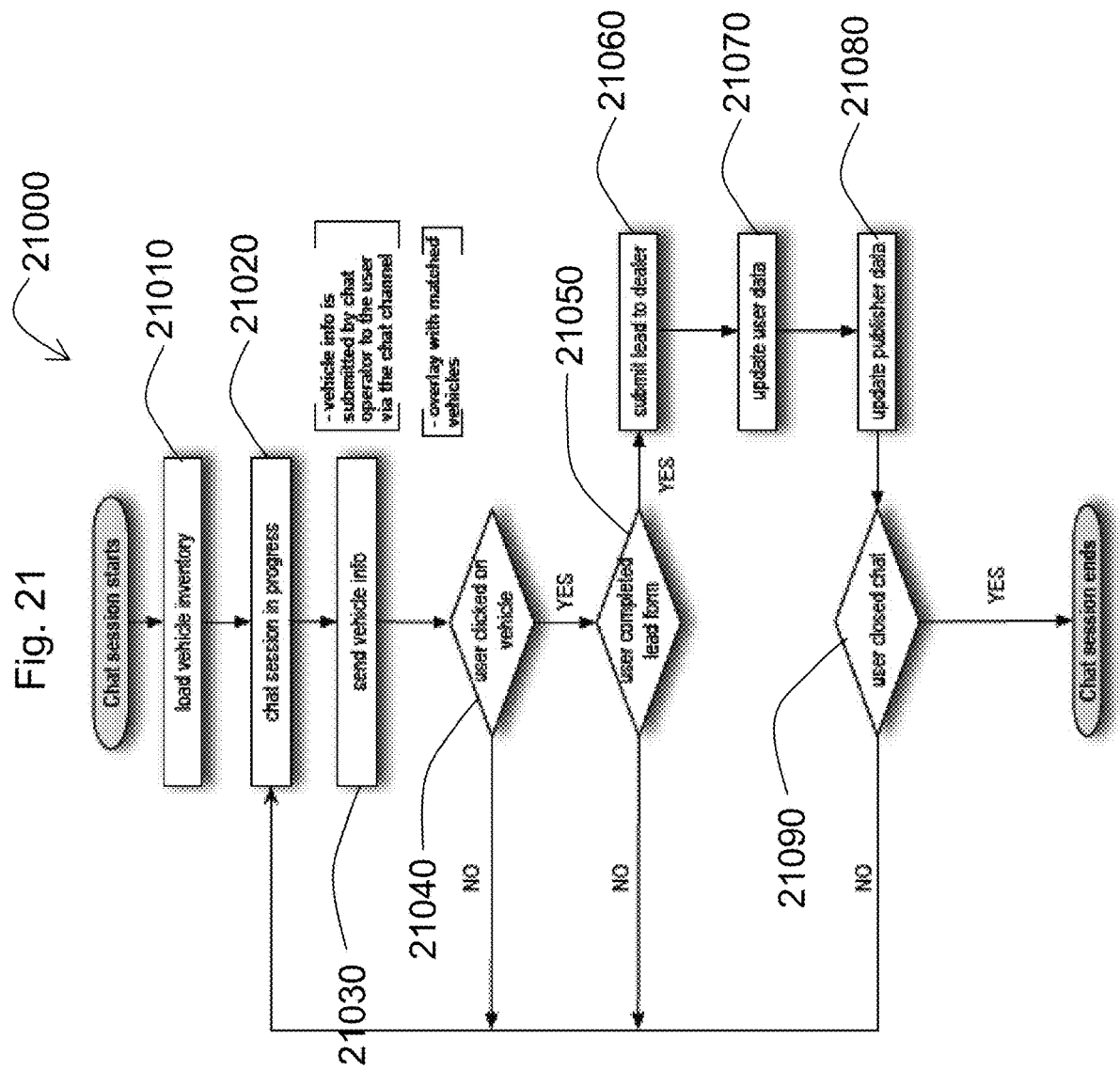
FIG. 21 is another exemplary process of a website lead generation system in accordance with a preferred embodiment of the present invention.

Turning to FIG. 21, a description of operation 21000 of the BEAST engine 1420 is shown in the context of marketing and selling vehicles. When a user is engaged in a chat session with a dealer, the dealer vehicle inventory is loaded, e.g., shown in the right panel of the chat engagement tool, providing the chat operator with information regarding the available inventory matching user criteria (Action Block 21010). Inventory information is updated periodically, e.g., nightly, to ensure inventory list is accurate. Further, the format of the inventory information can vary. To accommodate this, the system 1400 preferably can review any feed file headers and dynamically build search filters in accordance with the format based on the feed file header information. The vehicle inventory layout may provide complete information about a vehicle, including images.

If during the chat session (Action Block 21020), a customer asks about a vehicle or indicates to the operator that a particular vehicle is desired, the chat operator can insert information about the particular vehicle into the user's chat window, e.g., by clicking "Insert" button next to the vehicle in question (Action Block 21030). The vehicle information will be transferred to the user, who will be able to request additional information and/or view images. For example, the user's interface may include a "Request Info" button to bring up new dialogue, allowing the user to fill out and submit vehicle request form.

If the visitor selects an inventory item (Decision Block 21040) and completes a lead form (Decision Block 21050), the BEAST engine 1420 submits the lead information to the website owner/dealer (Action Block 21060). The BEAST engine 1420 then updates the visitor data (Action Block 21070) and the Publisher data (Action Block 21080) with the lead information and any other new information gathered during the inventory engagement session with the visitor (the update steps are similar to those described in FIG. 14a). The BEAST engine 1420 exits engagement when the visitor leaves the chat session (Decision Block 21090).

Figure 22:
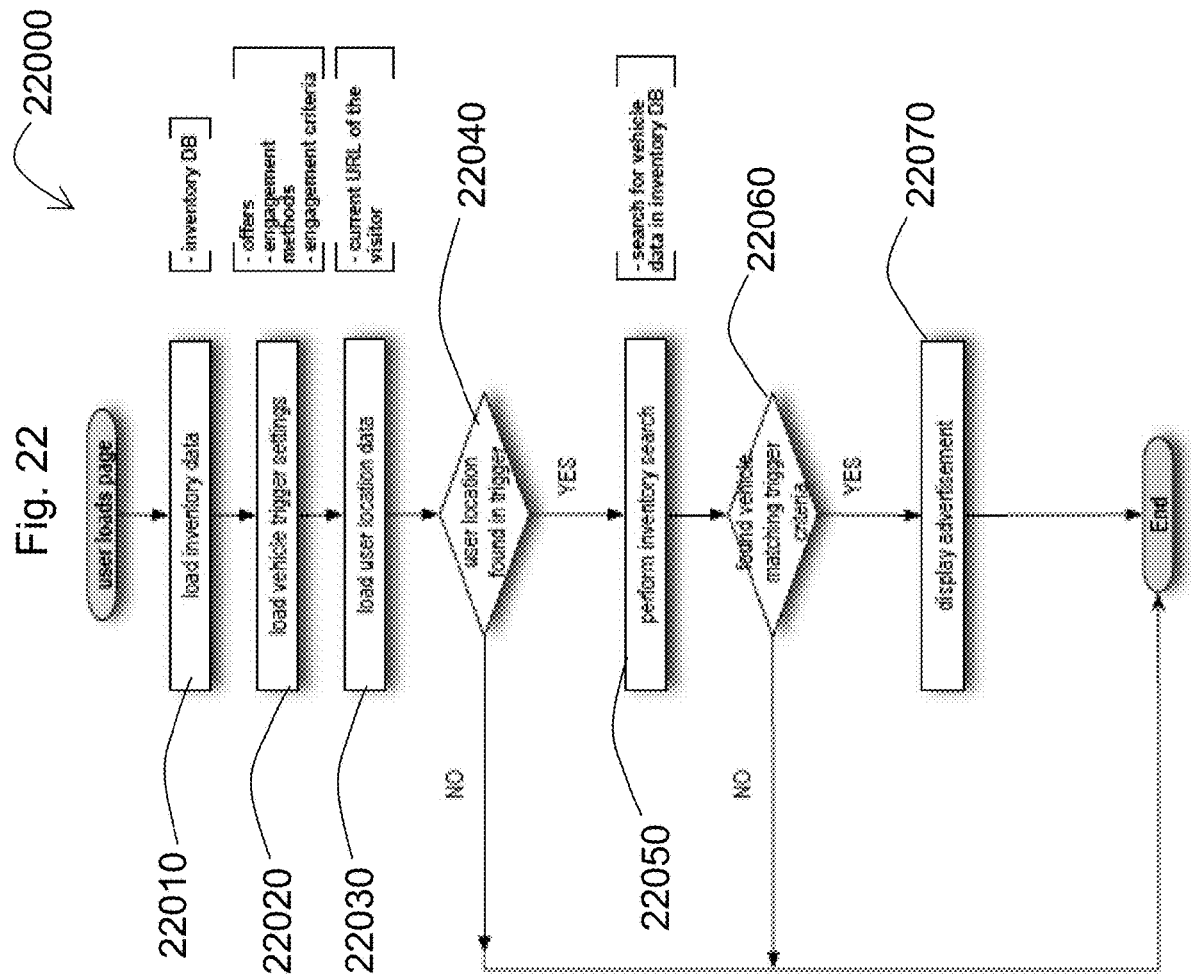
FIG. 22 is another exemplary process of a website lead generation system in accordance with a preferred embodiment of the present invention.

Turning to FIG. 22, a description of operation 22000 of the BEAST engine 1420 is shown in the context of marketing and selling vehicles. When a user loads a webpage operatively coupled to BEAST engine 1420, the BEAST engine 1420 will search the inventory database for available inventory (Action Block 22010). System 1400 will also load engagement tools, such as those described above, to capture trigger settings based on user's search activities, using, e.g., the electronic processes described above (Action Block 22020). System 1400 will also capture user's location, e.g., the current URL of the webpage currently loaded by the user (Action Block 22030). If the location matches data in a trigger setting (Decision Block 22040), then system 1400 will search for corresponding vehicles in the available inventory (Action Block 22050). If a match is found (Decision Block 22060), the matched inventory will be displayed as an advertisement (Action Block 22070), such as that shown in FIG. 19a.

Figure 23:
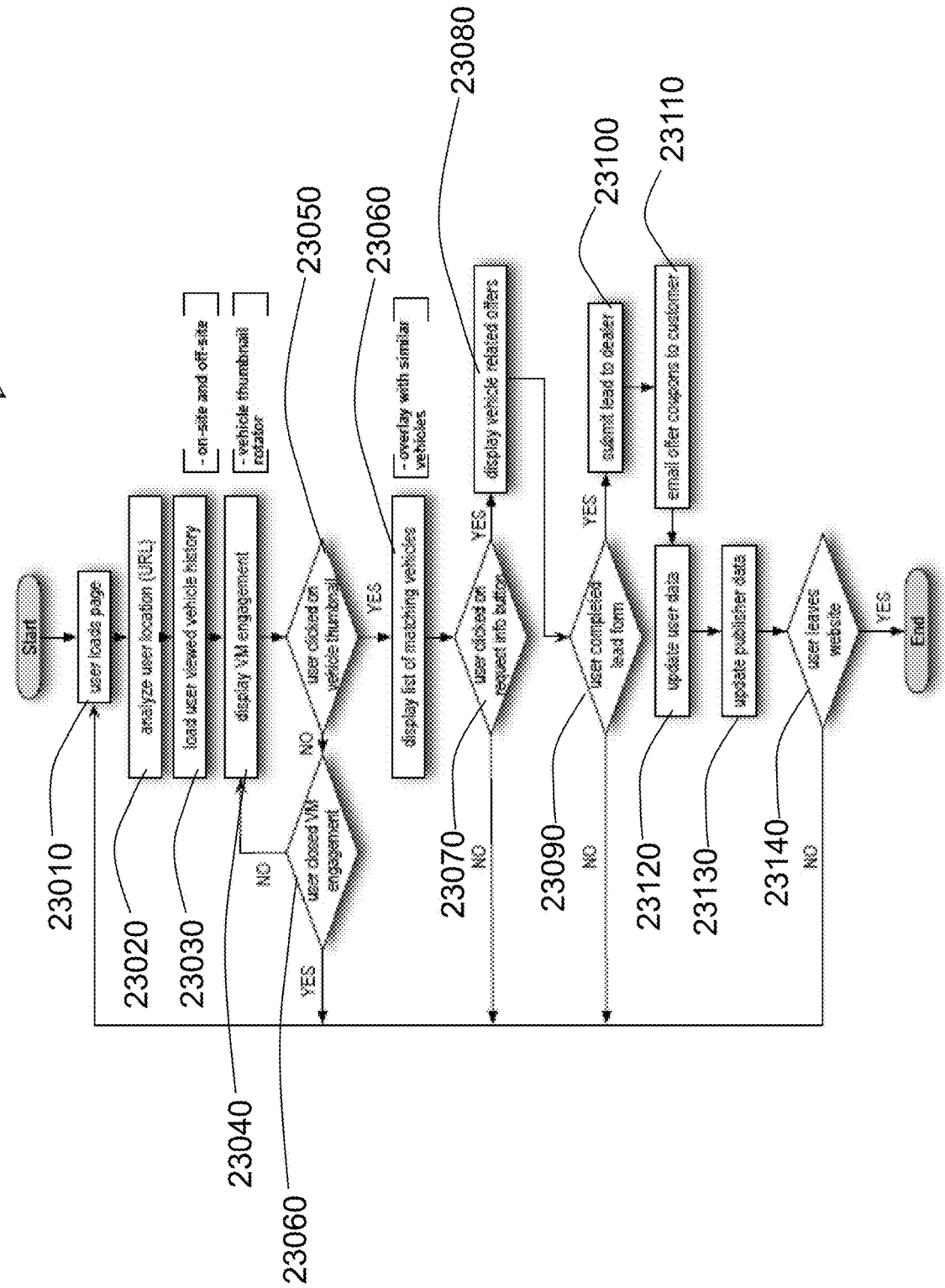
FIG. 23 is another exemplary process of a website lead generation system in accordance with a preferred embodiment of the present invention.

Turning to FIG. 23, a description of operation 23000 of the BEAST engine 1420 is shown in the context of marketing and selling vehicles. When a user loads a webpage operatively coupled to the BEAST engine (as described above) searching for a vehicle (Action Block 23010), the BEAST engine 1420 determines the current loaded webpage's URL (Action Block 23020). Further, the BEAST engine 1420 collects data on the viewed vehicle by collecting off-site and on-site user browsing history (Action Block 23030). With regard to off-site user activity, if one of the engagement tools above is active, e.g., the toolbar shown in FIG. 12, the toolbar may continue to collect data regarding all user activity, beyond activity on the particular web page loaded. With the collected data, BEAST engine 1420 is able to provide the user vehicle suggestions, using the methodologies described above, and present them using an engagement tool, such as those described above (Action Block 23040). Another engagement user interface 24000 is shown in FIG. 24.

Figure 24:
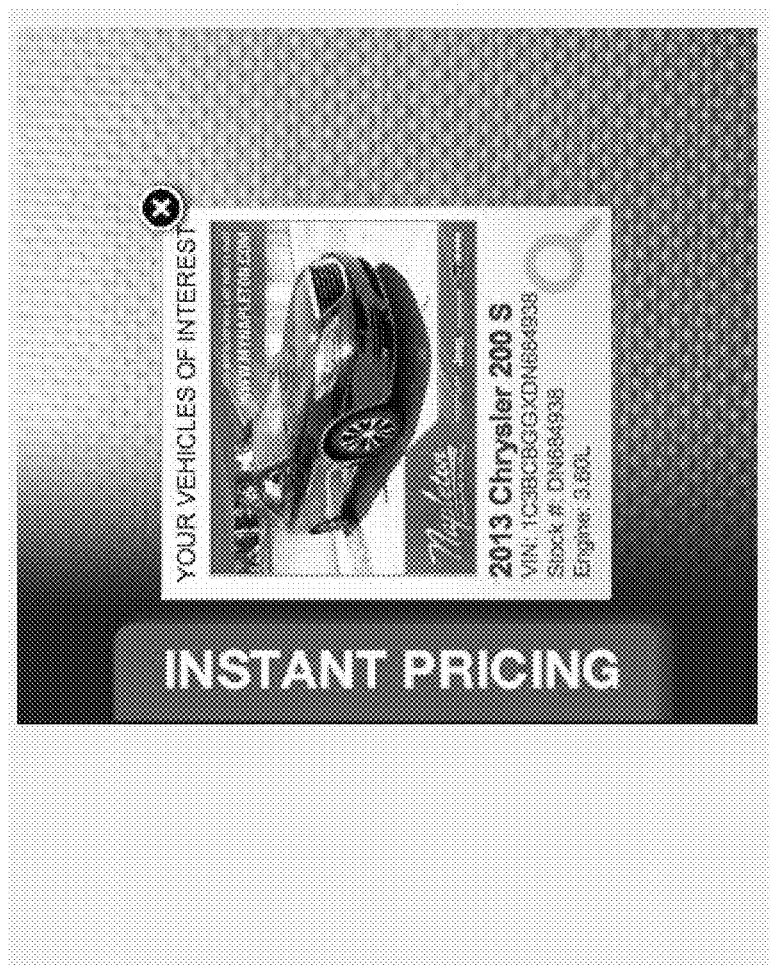
FIG. 24 is another exemplary engagement interface in accordance with a preferred embodiment of the present invention.
Figure 25:
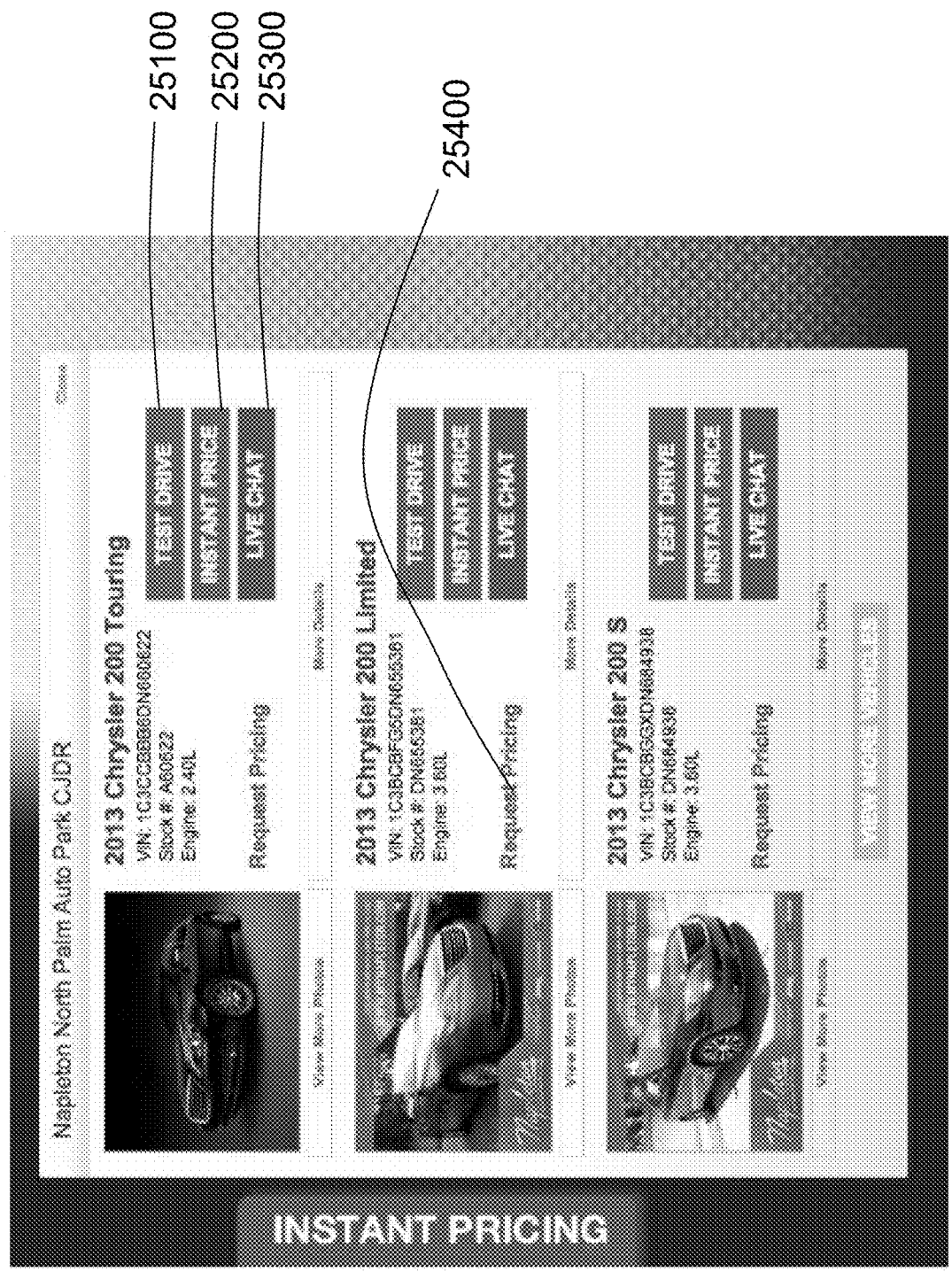
FIG. 25 is another exemplary engagement interface in accordance with a preferred embodiment of the present invention.

If the visitor does not select an inventory item, such as that shown in FIG. 24, and further closes the engagement tool (Decision Block 23060), such as that shown in FIG. 24, the operation 23000 starts at the beginning (e.g., Action Block 23010). If the visitor does select the inventory item, e.g., shown in FIG. 24, by, for example, clicking on the thumbnail image of the inventory item (Decision Block 23050), then a list of matching or similar vehicles is shown (Action Block 23060), e.g., as an overlay interface 25000 shown in FIG. 25. This interface 25000 provides the visitor with a number of options to select, including test drive 25100, instant price 25200, and live chat 25300. If the visitor requests more information about a particular vehicle, such as the options above, or a price request 25400 (Decision Block 23070), additional information regarding vehicle related offers is displayed (Action Block 23100) as well as a lead generation form for the user to fill out electronically, such as the interface 26000 shown in FIG. 26.

Figure 26:
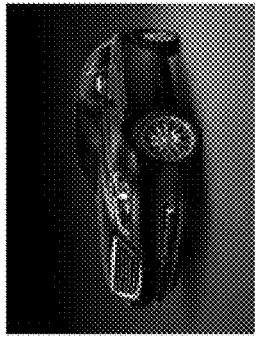
FIG. 26 is another exemplary engagement interface in accordance with a preferred embodiment of the present invention.

If the visitor completes a lead form, such as interface 26000 in FIG. 26 (Decision Block 23090), the BEAST engine 1420 submits the lead information to the website owner/dealer (Action Block 23100). The BEAST engine 1420 then emails the visitor one or more electronic offer coupons, if available, (Action Block 23110) and updates the visitor data (Action Block 23120) and the Publisher data (Action Block 23130) with the lead information and any other new information gathered during the inventory engagement session with the visitor (the update steps are similar to those described in FIG. 14a). The BEAST engine 1420 exits engagement when the visitor leaves the website (Decision Block 23140).

Figure 27A:
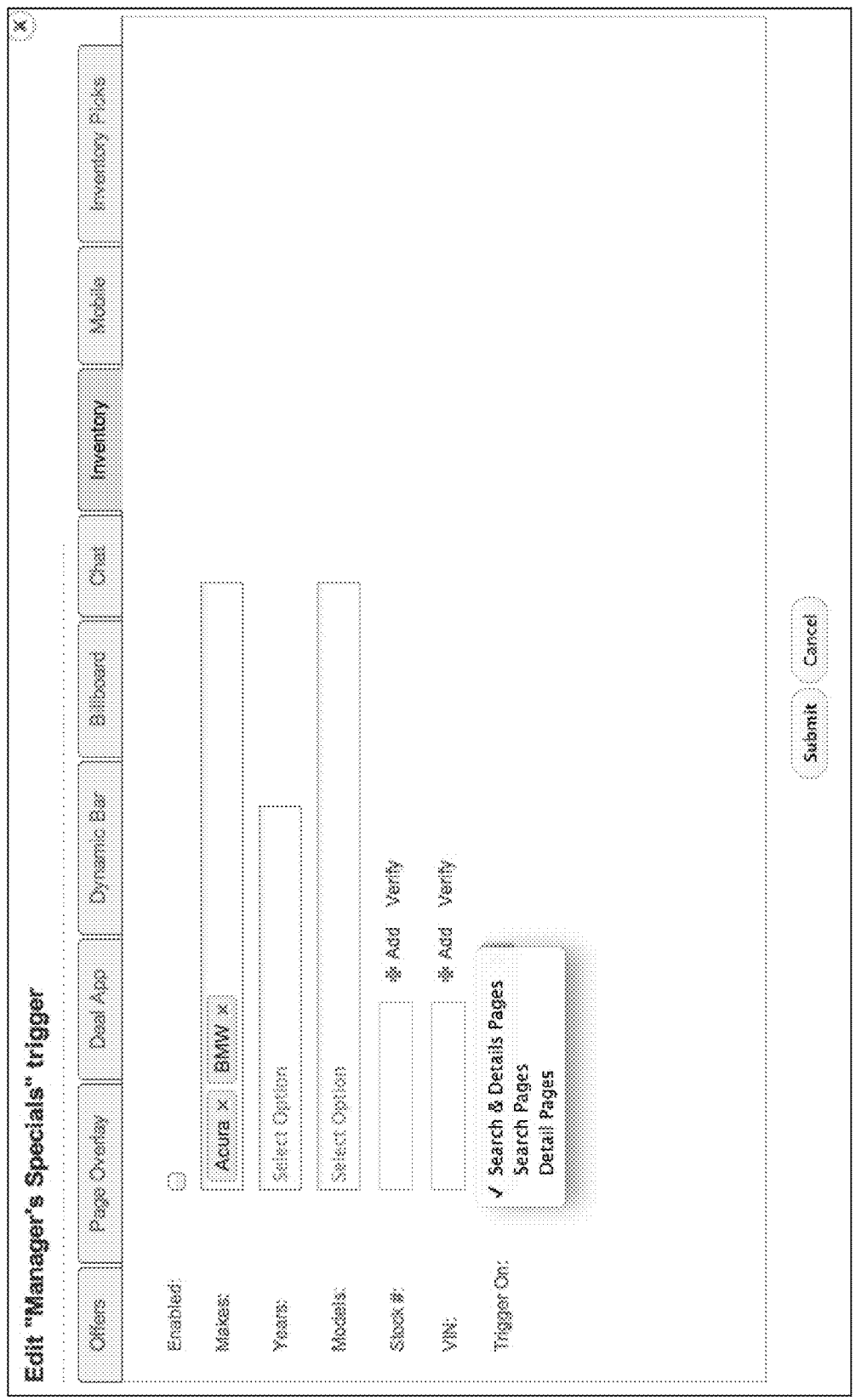
FIGS. 27a and 27b show an exemplary vehicle management control panel interface in accordance with a preferred embodiment of the present invention.
Figure 27B:
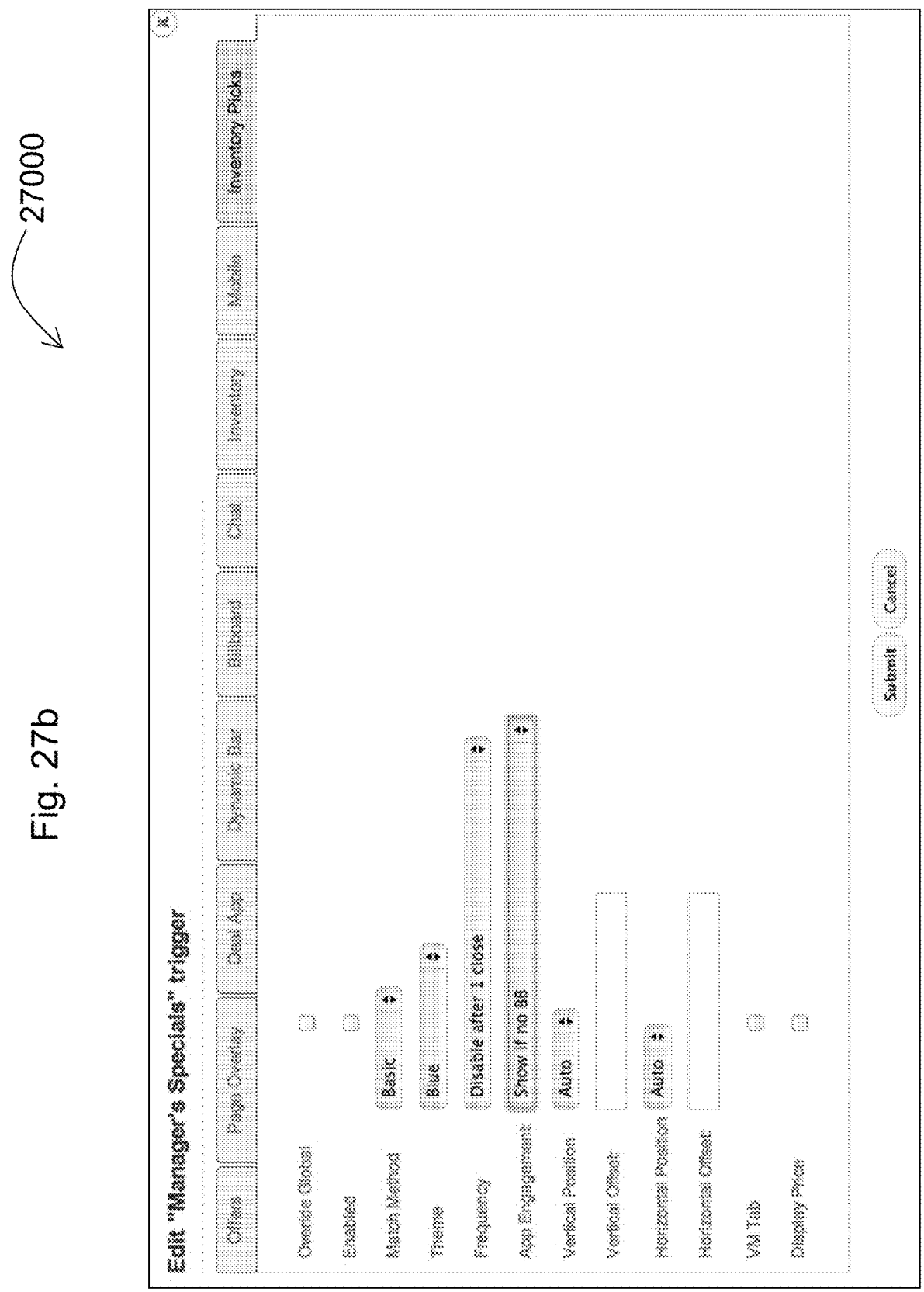

As one can appreciate, vehicle inventory must be imported into the system, e.g., 1000. Turning to FIG. 27a, a vehicle matching control panel 27000 in accordance with a preferred embodiment of the present invention is shown. The control panel 27000 may be used to import vehicle make, model, year, VIN, and stock # into the system. If a vehicle match is found for a customer visiting a website (e.g., a website described above), then system, e.g., 1000, will trigger a VM engagement tool, in accordance with one of the processes above, for example. Control panel 27000 also allows the system administrator to identify the trigger. Further, turning to FIG. 27b, the control panel 27000 allows the administrator to configure the position, theme, and functionality requirements of the dealer. The configuration can apply at a global level and/or at one or more specific URLs.

Figure 28A:
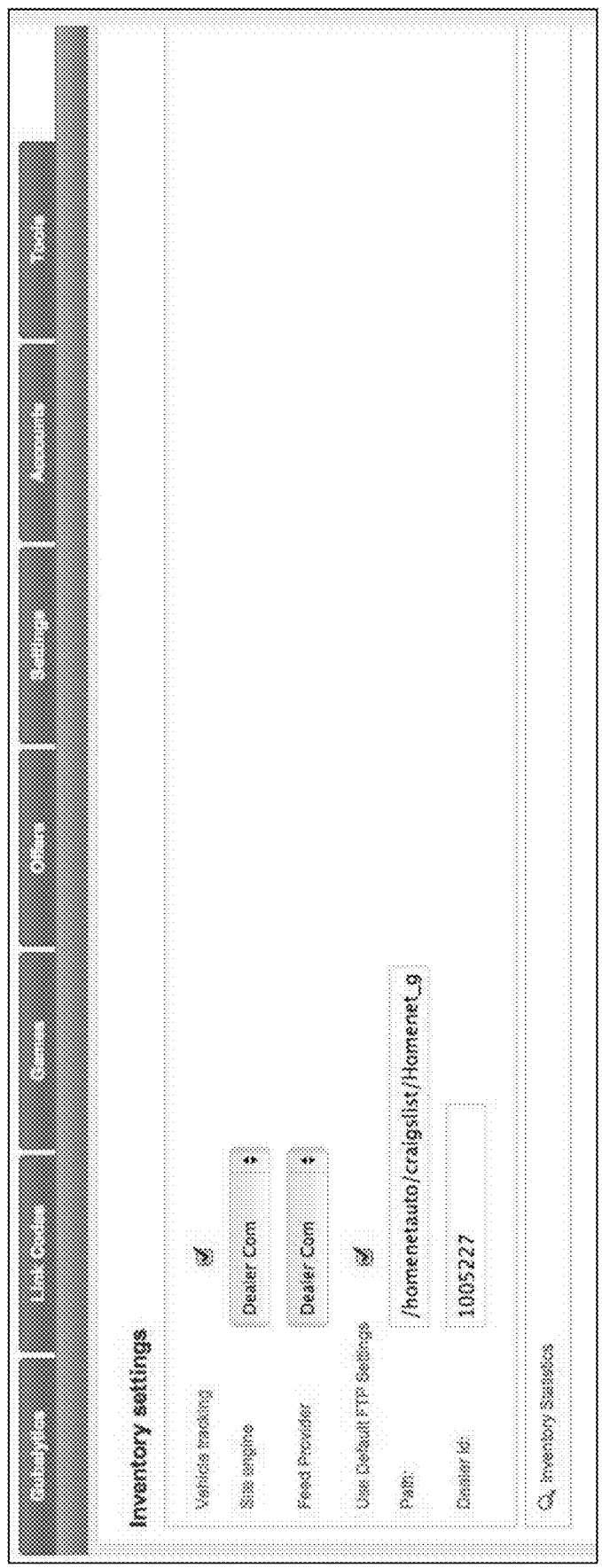

In one embodiment, the system, e.g., 1000, can accept inventory feeds from various feed providers. Turning to FIG. 28a, control panel interface 28000 is shown. With this interface 28000, the system administrator can identify one or more specific feed providers by, e.g., identifying the server path and dealer identification. Alternatively, this information can be manually entered.

Figure 28B:
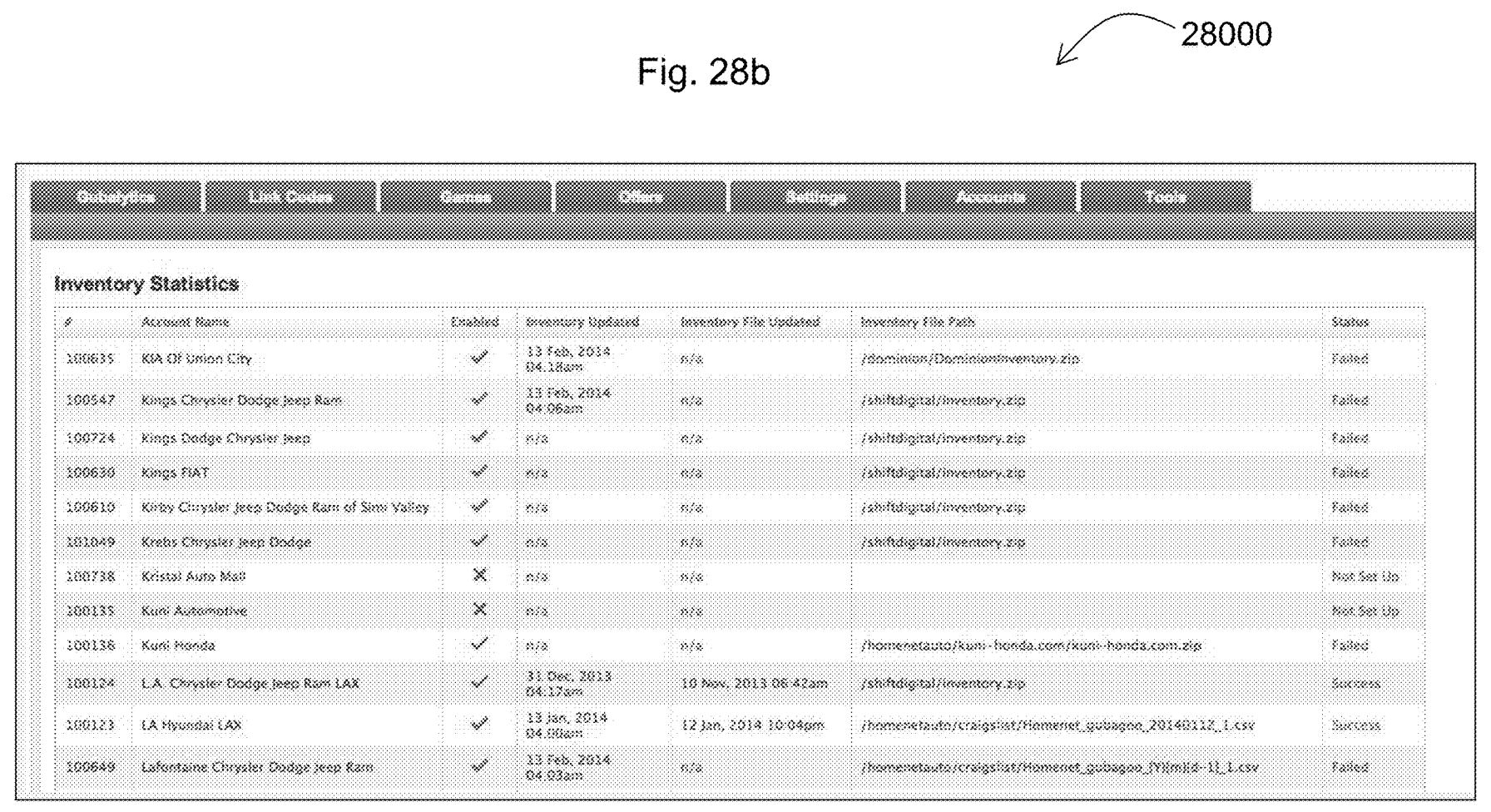

Turning to FIG. 28b, control panel 28000 can also display inventory feed statistics, including information on inventory feed status for each account in the system.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for generating leads based on user website behavioral patterns; however, the invention can be used for any lead generation system in general. Additionally and obviously, features may be added or subtracted as desired. Accordingly, the invention is not to be restricted except in light of the attached claims and their equivalents.

What is claimed is:

1. A computer-based system for generating website leads, comprising:
   a website lead generation server system including at least one processor and memory, operatively coupled to a webserver system with one or more webpages and an inventory feed for each of one or more feed providers and a public network, having a database that stores behavioral data associated with a plurality of users, said behavioral data derived from monitoring the plurality of users interacting with the one or more webpages of the webserver system, including inventory engagement information, wherein the website lead generation server system is configured to:
   for each of the plurality of users visiting the one or more webpages, create one or more visitor engagement profiles (VEPs) comprising one or more accumulative running scores;
   dynamically generate a plurality of responses based on the one or more VEPs, each of the VEPs comprising:
   for each of the plurality of users, a visitor data corresponding to a profile of the user, the user's device, and the user's behavioral patterns when interacting with the one or more webpages of the webserver system, and a publisher data;
   provide the plurality of responses for display at the user's device;
   receive information from the user;
   extract product information based on the information received from the user by parsing a current webpage loaded by the user;
   provide the information received from the user to a predetermined recipient; and
   update the database with the information received from the user; and
   an inventory review system operable to create search filters for the inventory feed based on the information received from the user's interactions with the one or more webpages,
   wherein the plurality of responses for display at the user's device include:
   a dynamically generated window that displays one or more inventory items queried from the search filters of the inventory review system and selectable by the user matching the extracted information; and
   a chat popup from a chat server system, operably coupled to the lead generation server system and the inventory review system, that provides an online chat session between the user and a chat operator, wherein the chat operator's device is provided access to one or more inventory items queried from the search filters, and further wherein the chat operator is enabled to insert data related to the one or more inventory items into the chat session for display on the user's device,
   wherein each of the one or more VEPs is appended with an index defining user activity, the index used for triggering configuration of the plurality of responses for display at the user's device.

2. The computer-based system of claim 1, wherein the website lead generation server system is further configured to update the database with behavioral patterns of the user when interacting with the webserver system.

3. The computer-based system of claim 1, wherein the webserver system further includes a graphical toolbar operatively coupled to the website lead generation server via a webserver interface.

4. The computer-based system of claim 1, wherein the database includes behavioral data patterns related to the user's interaction with all websites operatively coupled to the website lead generation server.

5. The computer-based system of claim 1, wherein the plurality of responses for display at the user's device are generated from the behavioral data associated with said user in the website lead generation server system.

6. The computer-based system of claim 1, wherein the one or more accumulative running scores increases as the user's interaction with the one or more webpages of the webserver system increases.

7. The computer-based system of claim 1, wherein the one or more accumulative score is reduced when the user is absent from the one or more webpages of the webserver system for more than a predetermined period of time.

\* \* \* \* \*